(12) United States Patent
Sasaki

(10) Patent No.: US 12,122,410 B2
(45) Date of Patent: Oct. 22, 2024

(54) CONTROL DEVICE FOR VEHICLE

(71) Applicant: TOYOTA JIDOSHA KABUSHIKI KAISHA, Aichi-ken (JP)

(72) Inventor: Hirotaka Sasaki, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 36 days.

(21) Appl. No.: 18/319,481

(22) Filed: May 18, 2023

(65) Prior Publication Data

US 2023/0382415 A1    Nov. 30, 2023

(30) Foreign Application Priority Data

May 31, 2022 (JP) ................................ 2022-088232

(51) Int. Cl.
| | |
|---|---|
| *B60W 50/14* | (2020.01) |
| *B60H 1/32* | (2006.01) |
| *B60W 60/00* | (2020.01) |

(52) U.S. Cl.
CPC ........... *B60W 50/14* (2013.01); *B60H 1/3207* (2013.01); *B60W 60/001* (2020.02); *B60W 2050/143* (2013.01); *B60W 2050/146* (2013.01)

(58) Field of Classification Search
CPC .............. B60W 50/14; B60W 60/001; B60W 2050/143; B60W 2050/146; B60H 1/3207
See application file for complete search history.

(56) References Cited

U.S. PATENT DOCUMENTS

| | | | |
|---|---|---|---|
| 10,012,993 B1* | 7/2018 | Matus | B60W 60/0053 |
| 11,351,892 B1* | 6/2022 | Roy | B62D 1/183 |
| 2003/0211820 A1 | 11/2003 | Tsuji et al. | |
| 2016/0357262 A1* | 12/2016 | Ansari | B60H 1/00742 |
| 2019/0033860 A1* | 1/2019 | Okimoto | B60H 1/00964 |
| 2019/0225189 A1* | 7/2019 | Maeda | B60H 1/00849 |
| 2021/0206384 A1* | 7/2021 | Nishiyama | G06F 3/017 |

FOREIGN PATENT DOCUMENTS

| | | |
|---|---|---|
| JP | 2003-326936 A | 11/2003 |
| JP | 2017-210019 A | 11/2017 |
| JP | 2019-123277 A | 7/2019 |
| JP | 6669273 B2 | 3/2020 |

* cited by examiner

*Primary Examiner* — Mohamed Barakat

(74) *Attorney, Agent, or Firm* — HAUPTMAN HAM, LLP

(57) ABSTRACT

A control device is provided to make recognize an occupant that an operation by the occupant may affect an anti-fog performance of an air conditioner unit, and to control the anti-fog performance of the occupant's own will. When the occupant operates an air conditioner operation panel during self-driving in LV3 and when the operation possibly lowers the anti-fog performance of the air conditioner unit, the occupant is notified of; information that the operation possibly lowers the anti-fog performance; and information to preannounce lowering of the self-driving level to LV2 after elapse of a predetermined time. When the operation is cancelled before elapse of the predetermined time, the notification is terminated and the self-driving in LV3 is maintained. When the operation is not cancelled before elapse of the predetermined time, the self-driving level is switched to LV2 and an air-conditioning state is switched according to the operation.

6 Claims, 12 Drawing Sheets

CONTROL DEVICE FOR VEHICLE

CROSS-REFERENCE TO RELATED APPLICATIONS

The present application claims priority under 35 U.S.C. § 119(a) to Japanese Patent Application No. 2022-088232, filed on May 31, 2022. The contents of this application are incorporated herein by reference in its entirety.

TECHNICAL FIELD

The present invention relates to a control device for a vehicle. Especially, the present invention relates to improvement of control of a vehicle including: a self-driving system to perform self-driving of the vehicle; and an air conditioner system that exerts an anti-fog function to prevent fogging of the window according to a self-driving degree that is a degree of dependence on the self-driving system for driving operation (which is called, generally, as a "self-driving level").

BACKGROUND ART

Recently, vehicles having a self-driving system have been developed, which is capable of changing a self-driving degree of the self-driving according to a request from an occupant and a state of a vehicle. Also, Patent Document 1 discloses a technique to automatically change an anti-fog performance (i.e. a level of anti-fog function) of an air conditioner unit according to the self-driving degree. Specifically, the air conditioner unit is controlled such that: the anti-fog performance is decreased as the self-driving degree is larger (as the degree of dependence on the self-driving system for the driving operation increases, in other words, as the degree of intervention by a driver in the driving operation decreases); and the anti-fog performance is enhanced before the self-driving degree decreases when a sign that the self-driving degree decreases is detected.

PRIOR ART DOCUMENT

Patent Document

[Patent Document 1] JP 6669273

SUMMARY OF THE INVENTION

Problem to be Solved by the Invention

However, when an occupant changes the setting of the air conditioner unit by operating an air conditioner operation panel from the state in which the anti-fog performance of the air conditioner unit is controlled according to the self-driving degree, such an operation by the occupant may lower the anti-fog performance of the air conditioner unit. Examples of the above operations include a case in which the occupant operates the air-conditioner operation panel to change an air outlet mode of the air conditioner unit from a defroster mode (mode in which the air is blown toward the front window) to a foot mode (mode in which the air is blown toward the feet of the occupant).

In the above case, when the operating state of the air conditioner unit is changed according to the operation of the occupant, it may be difficult to maintain the anti-fog effect by the air conditioner unit, and also in such a case, the occupant may not recognize that his/her operation might have been an operation to lower the anti-fog performance of the air conditioner unit. As a result, the anti-fog performance may be decreased against the occupant's own will.

The present invention was made in consideration of the above circumstances, an object of which is to provide a control device that makes recognize an occupant a situation in which his/her operation may affect the anti-fog performance of an air conditioner unit (air conditioner system), so that the occupant controls the anti-fog performance of his/her own will.

Means for Solving the Problem

In order to achieve the above object, the present invention is related to a control device for a vehicle including a self-driving system that performs self-driving of the vehicle and an air conditioner system that performs an anti-fog function to prevent fogging of a window of the vehicle according to a self-driving degree that is a degree of dependence on the self-driving system for a driving operation. The control device includes: an air conditioner operation section being operated by an occupant when the occupant wants to change an air-conditioning state in a cabin; a notification unit giving a notification to the occupant; and a notification information generation section generating notification information to notify the occupant of the notification that is derived from an operation of the air conditioner operation section by the occupant and that is given from the notification unit, under a condition that a predetermined condition is satisfied by a fact that the operation of the air conditioner operation section by the occupant has a possibility to change an anti-fog performance of the air conditioner system that is in an operating state exerting the anti-fog performance according to the self-driving degree.

With the above-described configuration, when the occupant operates the air conditioner operation section (i.e. performs the operation of the air conditioner operation section that possibly changes the anti-fog performance of the air conditioner system) in the state in which the self-driving of the vehicle is performed and the air conditioner system is operated to exert the anti-fog performance according to the self-driving degree, and when the predetermined condition is satisfied as a result of the operation, the notification information generation section generates the notification information to notify the occupant of the notification derived from the operation of the air conditioner operation section so that the notification unit gives the notification (notification derived from the operation of the air conditioner operation section) to the occupant.

With the above-described configuration, it is possible for the occupant who receives the notification from the notification unit to recognize that the operation of the air conditioner operation section performed by him/herself has the possibility to: affect the anti-fog performance of the air conditioner system; and affect the self-driving of the vehicle (in the case where the self-driving system changes the self-driving degree according to the change in the anti-fog performance). Thus, when the occupant recognizes that the anti-fog effect by the air conditioner system may not be maintained due to the operation of the air conditioner operation section performed by him/herself, the occupant can select, of his/her own will, to maintain the anti-fog performance of the air conditioner system (give priority to prevention of the fogging of the window) by restoring the operating state to the original state, or to realize the air-conditioning operation in response to his/her performed operation of the air conditioner operation section (give priority to comfortability by air-conditioning in accordance with his/her request). As a result, it is possible to prevent decrease of the anti-fog performance of the air conditioner system against the occupant's own will.

Specifically, the predetermined condition is that the operation of the air conditioner operation section by the occupant has a possibility to lower the anti-fog performance of the air conditioner system, and the notification information includes information that the operation of the air conditioner operation section by the occupant has the possibility to lower the anti-fog performance of the air conditioner system.

With the above-described configuration, the occupant who receives the notification from the notification unit recognizes that the operation of the air conditioner operation section performed by him/herself has the possibility to lower the anti-fog performance of the air conditioner system. Thus, the occupant can understand that it is necessary to perform the cancel operation of his/her operation of the air conditioner operation section (i.e. operation to restore the air conditioner setting to the original state) if he/she wants to maintain the operating state before his/her operation (i.e. the operating state in which the air conditioner system is operated to exert the anti-fog performance according to the self-driving level). That is, it is possible to maintain the operating state of the air conditioner operation section before his/her operation by performing the cancel operation to his/her operation of the air conditioner operation section. On the other hand, if the occupant wants to realize his/her operation of the air conditioner operation section (i.e. realize the air-conditioning operation according to his/her operation of the air conditioner operation section), it is possible to establish the air-conditioning operation according to his/her operation of the air conditioner operation section by not performing the cancel operation of his/her operation of the air conditioner operation section. Thus, by notifying the occupant that the operation of the air conditioner operation section possibly lowers the anti-fog performance of the air conditioner system, it is possible to control the operating state reflecting the occupant's own will.

Also, the predetermined condition may be that the fogging of the window is estimated to occur by an estimation operation of the fogging of the window based on the operation of the air conditioner operation section by the occupant and based on a cabin environment, and the notification information may include information that the fogging of the window is estimated to occur by the estimation operation.

In this case also, when the estimation operation estimates that the fogging of the window occurs, the occupant who receives the notification from the notification unit recognizes that the fogging of the window will occur. Thus, the occupant can understand that it is necessary to perform the cancel operation of his/her operation of the air conditioner operation section if he/she wants to maintain the operating state before his/her operation. On the other hand, if the occupant wants to realize his/her operation of the air conditioner operation section, it is possible to establish the air-conditioning operation according to his/her operation of the air conditioner operation section by not performing the cancel operation of his/her operation of the air conditioner operation section. Thus, with this configuration also, by notifying the occupant that the fogging of the window is estimated to occur, it is possible to control the operating state reflecting the occupant's own will.

Also, the notification information may include: information to preannounce that the self-driving degree is lowered after elapse of a predetermined time; or information to preannounce that the self-driving is terminated after elapse of the predetermined time.

When the anti-fog performance of the air conditioner system possibly lowers due to the operation of the air conditioner operation section by the occupant or when the fogging of the window is estimated to occur, the self-driving according to the current self-driving degree might not be maintained any more. Therefore, in the above-described configuration, when the operation of the air conditioner operation section by the occupant has the possibility to lower the anti-fog performance of the air conditioner system, or when the fogging of the window is estimated to occur due to the operation of the air conditioner operation section by the occupant, the occupant is notified that: the self-driving degree is lowered after elapse of the predetermined time; or the self-driving is terminated after elapse of the predetermined time. In this way, it is possible for the occupant to select, of his/her own will, to maintain the self-driving according to the current self-driving degree by performing the cancel operation of his/her operation of the air conditioner operation section, or to switch the air-conditioning operation state according to his/her operation of the air conditioner operation section even if the self-driving according to the current self-driving degree is no longer performed (i.e. the self-driving degree is lowered or the self-driving is terminated) by not performing the cancel operation of his/her operation of the air conditioner operation section. In this way also, by notifying the occupant of the information, it is possible to control the operating state reflecting the occupant's own will.

Specifically, when the operation of the air conditioner operation section is cancelled by the occupant before elapse of the predetermined time, the notification from the notification unit is terminated, and furthermore the self-driving according to the current self-driving degree is maintained by the self-driving system. When the operation of the air conditioner operation section is not cancelled by the occupant before elapse of the predetermined time, the air-conditioning operation state is switched according to the operation of the air conditioner operation section, and furthermore the self-driving degree is lowered or the self-driving is terminated by the self-driving system.

Examples of the operations that lower the self-driving degree or that terminate the self-driving include a switching of the driving operation of the vehicle from the self-driving degree at which the responsible for the self-driving is the self-driving system to the self-driving degree at which the responsible for the self-driving is the occupant.

When the operation of the air conditioner operation section is cancelled by the occupant before elapse of the predetermined time, the occupant can recognize, by termination of the notification from the notification unit, that the self-driving according to the current self-driving degree is maintained. On the other hand, when the operation of the air conditioner operation section is not cancelled by the occupant before elapse of the predetermined time, the air-conditioning operation state of the air conditioner system is switched according to the operation of the air conditioner operation section, and furthermore the self-driving degree is lowered or the self-driving is terminated by the self-driving system. That is, although the self-driving degree is lowered or the self-driving is terminated, the occupant can obtain comfortability by air-conditioning according to his/her own request since the air-conditioning operation is performed in response to the operation of the air conditioner operation section.

Also the predetermined condition may be that the operation of the air conditioner operation section by the occupant has the possibility to lower the anti-fog performance of the air conditioner system, and the notification information may include information that the operation of the air conditioner operation section is not accepted.

In this case, the occupant who receives the notification from the notification unit recognizes that the operation of the air conditioner operation section by him/herself is disabled and that the current self-driving of the vehicle and the anti-fog performance (i.e. the anti-fog performance according to the self-driving degree) of the air conditioner system are maintained. That is, the occupant can recognize that the operation of the air conditioner operation section is disabled because the operation of the air conditioner operation section performed by him/herself has the possibility to affect the self-driving degree of the self-driving as well as the anti-fog performance of the air conditioner system and thus it is necessary to avoid the influence. In this way, it is possible to prevent the situation in which the operation of the air conditioner operation section is disabled without any notification and accordingly the occupant suspects malfunction of the air conditioner system.

Advantageous Effects of the Invention

In the present invention, when the predetermined condition is satisfied by a fact that the operation of the air conditioner operation section by the occupant has a possibility to change the anti-fog performance of the air conditioner system that is in the operating state exerting the anti-fog performance according to the self-driving degree (a degree of dependence on the self-driving system for a driving operation), a notification derived from the operation is given to the occupant.

Therefore, it is possible to make the occupant recognize the situation in which the operation of the occupant may affect the anti-fog performance of the air conditioner system, and thus to control the anti-fog performance of his/her own will.

DESCRIPTION OF EMBODIMENTS

Hereinafter, embodiments of the present invention will be described with reference to the drawings. Here, the description is given on the case where the present invention is applied to a vehicle including a self-driving system in which a self-driving level (the self-driving degree in the present invention) can be switched to any level in the range of level 0 to level 5.

First Embodiment

Figure 1:
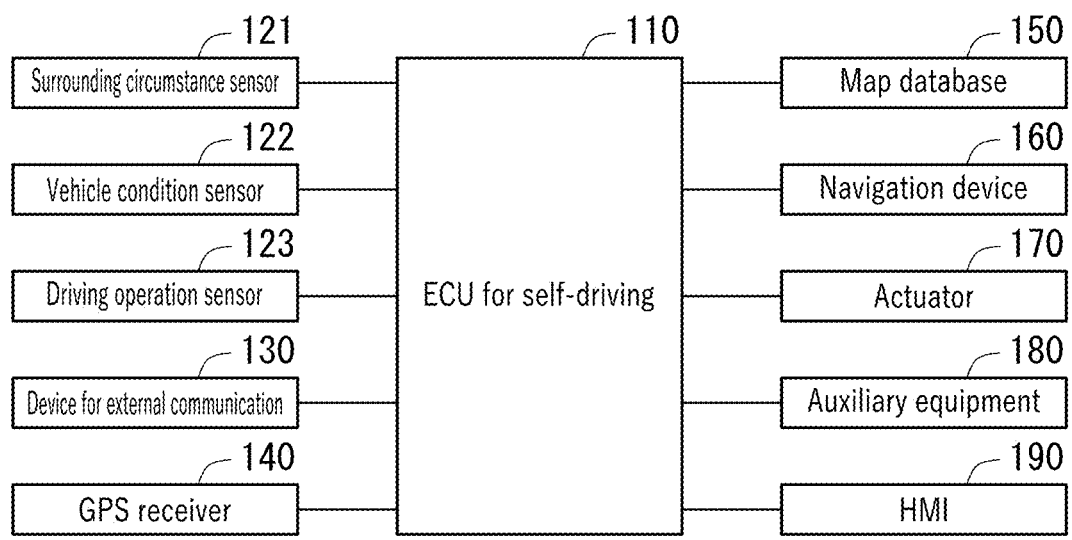
FIG. 1 is a diagram illustrating a schematic configuration of a self-driving system mounted on a vehicle according to embodiments.

Firstly, a first embodiment is described.
—Self-Driving System—
Here, a self-driving system mounted on a vehicle according to this embodiment is described. FIG. 1 is a diagram illustrating a schematic configuration of a self-driving system 100 mounted on a vehicle according to this embodiment. As shown in FIG. 1, the self-driving system 100 according to this embodiment includes an ECU 110 for self-driving, which serves as a control center of the self-driving of the vehicle. To the ECU 110 for self-driving, the following are connected: a surrounding circumstance sensor 121; a vehicle condition sensor 122; a driving operation sensor 123; a device 130 for external communication; a GPS receiver 140; a map database 150; a navigation device 160; an actuator 170; auxiliary equipment 180; and an HMI (Human Machine Interface) 190.

Hereinafter, the vehicle having the self-driving system 100 is referred to as "own vehicle" when it is necessary to distinguish the above vehicle from other vehicles. Also, the own vehicle is a vehicle capable of performing both the self-driving that does not require any driving operation by the occupant and the manual driving that is realized by the driving operations by the occupant (occupant who is a driver). Switching of the level of the self-driving (self-driving level that is the self-driving degree of the present invention) will be described later.

The surrounding circumstance sensor 121 is a sensor that acquires information on the circumstances in the vicinity of the own vehicle. The information on the circumstances in the vicinity of the own vehicle includes pieces of information on: the road in front of the own vehicle; obstacles in the vicinity of the own vehicle (e.g. other vehicles, pedestrians, buildings, and curbstones); weather; and brightness.

The surrounding circumstance sensor 121 includes, for example: a camera; a LIDAR (Laser Imaging Detection and Ranging); and a millimeter wave radar sensor. The surrounding circumstance sensor 121 is not necessarily required to have all of the above elements, and may also include other elements. In brief, the surrounding circumstance sensor 121 is only required to be a sensor capable of detecting the surrounding circumstances necessary for executing the self-driving.

The camera takes images of the vicinity of the own vehicle from the inside of the own vehicle, and processes the taken images so as to acquire and transmits to the ECU 110 for self-driving the following kinds of information: information on an obstacle in the vicinity of the own vehicle; traffic information in the vicinity of the own vehicle (e.g. the road shape, the number of lanes, the road signs, existence or non-existence of the white line, and the traffic light state); positional information of the own vehicle with respect to the lane (e.g. the relative direction of the own vehicle with respect to the center line of the lane, and the deviation amount in the lateral direction); and weather information in the vicinity of the own vehicle (e.g. information on rain, snow, and fog). The camera may take the images only in front of the own vehicle. Alternatively, a plurality of cameras may take the entire circumference of the own vehicle.

The LIDAR sequentially irradiates, for example, the entire circumference of the own vehicle with laser beam so as to measure the distance to the road and the obstacle using the reflected light. The LIDAR generates, based on the measured results, a three-dimensional image of the road and the obstacle in the entire circumference of the own vehicle, and transmits the information on the three-dimensional image to the ECU 110 for self-driving.

The millimeter wave radar sensor is a sensor that detects an obstacle around the vehicle in the range larger than the range that is detected by the LIDAR. The millimeter wave radar sensor is provided on an outer peripheral part of the own vehicle (for example, on a front bumper, a rear bumper, or the like). The millimeter wave radar sensor sends a millimeter wave band of radio wave and receives a reflected wave thereof. Thus, the millimeter wave radar sensor measures, based on the transmitted wave and received wave: the relative position (i.e. the distance and direction) with respect to the obstacle that exists around the own vehicle; and the relative velocity to the obstacle. The millimeter wave radar sensor transmits information on the obstacle as the measured result to the ECU 110 for self-driving.

The vehicle condition sensor 122 includes, for example: a vehicle speed sensor that detects the traveling speed of the own vehicle; a forward-backward acceleration sensor that detects acceleration of the own vehicle in the front-back direction; a lateral acceleration sensor that detects acceleration of the own vehicle in the lateral direction; and a yaw rate sensor that detects the yaw rate of the own vehicle. The vehicle condition sensor 122 transmits information on the detected results to the ECU 110 for self-driving.

The driving operation sensor 123 includes, for example: an accelerator operation amount sensor that detects an operation amount of an accelerator pedal; a brake operation amount sensor that detects an operation amount of a brake pedal; a brake switch that detects whether the brake pedal is operated or not; a steering angle sensor that detects a steering angle; a steering torque sensor that detects a steering torque; and a shift position sensor that detects a shift position of a transmission. The driving operation sensor 123 transmits information on the detected results to the ECU 110 for self-driving.

The device 130 for external communication is a device that performs communication between the own vehicle and the outside of the own vehicle so as to acquire information on the surrounding environment of the own vehicle. For example, the device 130 for external communication acquires, by communication with an information center, the traffic information and the like regarding the traveling environment of the own vehicle. The device 130 for external communication also acquires the traffic information and the like by road-to-vehicle communication with a roadside unit provided on the road or by vehicle-to-vehicle communication with another device 130 for external communication mounted on another vehicle. The device 130 for external communication transmits the acquired information on the surrounding environment to the ECU 110 for self-driving.

The GPS receiver 140 receives signals from a GPS satellite so as to measure the position of the own vehicle. The GPS receiver 140 transmits the positional information on the own vehicle as the measured result to the ECU 110 for self-driving.

The map database 150 is a database including map information, which is stored in a memory device such as a hard disk mounted on the own vehicle. The map information includes, for example: positional information on the road; information on the road shape (e.g. the kind of the road shape (curved or straight road), and the curvature radius of the curved road); positional information on an intersection or crossroads; road type information (information for establishing distinction among the motorway, the highway, the normal road and the like); and information on the number of lanes.

The navigation device 160 guides the own vehicle to the destination set by the occupant. The navigation device 160 calculates an optimal route to the destination based on the current positional information on the own vehicle detected by the GPS receiver 140 and the map information in the map database 150. The navigation device 160 transmits the information on the optimal route as navigation information to the ECU 110 for self-driving. Also, the navigation device 160 has a spot registration function to register a desired spot. When the self-driving is not performed (when the vehicle is driven by the driving operations of the occupant who is a driver), the navigation device 160 guides the driver to the destination.

The actuator 170 includes, for example: a driving force actuator; a brake actuator; and a steering actuator. Specifically, when the driving source of the own vehicle is an engine, the driving force actuator is an engine and an actuator for changing the operating state of the engine (such as a throttle valve actuator). In the case where the own vehicle is an electric vehicle, the driving force actuator is a drive motor and a motor drive circuit that controls energization of the drive motor.

When the brake device of the own vehicle is, for example, a hydraulic brake device, the brake actuator is a hydraulic friction brake system and a hydraulic control circuit that controls hydraulic pressure of the wheel cylinder of the hydraulic friction brake system.

When the own vehicle is provided with an electric power steering device, the steering actuator is a steering motor incorporated in a steering mechanism and a motor drive circuit that controls energization of the steering motor.

The ECU 110 for self-driving generates target driving force by transmitting, to the driving force actuator, a driving force control signal according to the target driving force. Also, the ECU 110 for self-driving generates target braking force by transmitting, to the brake actuator, a braking force control signal according to the target braking force. Furthermore, the ECU 110 for self-driving generates target steering torque (or steering torque for making the actual steering angle follow the target steering angle) by transmitting, to the steering actuator, a steering control signal according to the target steering torque (or the target steering angle).

Thus, the ECU 110 for self-driving can control the traveling of the own vehicle by transmitting the control signals to the actuator 170 even when the driver does not perform the driving operations (i.e. the steering operation, the accelerator operation, and the brake operation).

The auxiliary equipment 180 is a collective term for the devices not included in the actuator 170. For example, the auxiliary equipment 180 includes a direction indicator, a headlight, and a windscreen wiper. The ECU 110 for self-driving controls operations of the auxiliary equipment 180 by outputting operation signals to the auxiliary equipment 180.

HMI (notification unit) 190 is an interface with which the occupant and the self-driving system 100 input/output information. For example, the HMI 190 includes: a display for displaying character information or image information; a speaker and a buzzer for generating sound; and operation buttons, a touch panel and a microphone with which the occupant perform input operations.

The ECU 110 for self-driving includes, for example: a processor such as a CPU (Central Processing Unit); a ROM (Read-Only Memory) to store control programs; a RAM (Random-Access Memory) to temporarily store data; and an input/output port. When the self-driving is performed, the ECU 110 for self-driving controls the operation of the actuator 170 while monitoring the surroundings of the own vehicle based on the information provided from the surrounding circumstance sensor 121 such that the own vehicle safely travels on the optimal route.

In the self-driving system 100 according to this embodiment, six self-driving levels are defined. The traveling of the own vehicle is controlled according to a driving mode corresponding to each self-driving level. The definition of the self-driving level is provided in "Guidelines for Safety Technology of Self-Driving Automobiles" issued by the Road Transport Bureau of the Ministry of Land, Infrastructure, Transport and Tourism in Japan. The self-driving system 100 according to this embodiment controls the vehicle traveling in the self-driving level following the above Guidelines.

When the self-driving level is level 0 (hereinafter occasionally referred to as "LV0"), the driving mode is set to a manual driving mode where no automatic driving is performed. Accordingly, the driver is required to perform all the driving operations such as an accelerator pedal operation, a brake pedal operation, and a steering operation under his/her own safety monitoring.

When the self-driving level is level 1 (hereinafter occasionally referred to as "LV1"), the self-driving system 100 performs a subtask of vehicle driving control in either of the longitudinal direction or the lateral direction in a limited domain. The "vehicle driving control in the longitudinal direction" means vehicle acceleration/deceleration control (vehicle speed control). The "vehicle driving control in the lateral direction" means vehicle steering control. Accordingly, the driver is required to perform either one of the pedal operation and the steering operation. In LV1, the driver is also required to monitor safe driving. Furthermore, when the continuous operation of the self-driving system 100 is difficult, the driver is in charge of addressing the situation.

When the self-driving level is level 2 (hereinafter occasionally referred to as "LV2"), the self-driving system 100 performs a subtask of the vehicle driving control both in the longitudinal direction and the lateral direction in the limited domain. Accordingly, the driver (the occupant who sits in the driver's sheet) is not required to perform any of the pedal operation and the steering operation. In LV2 also, the driver is required to monitor safe driving similarly to the case in LV1. Furthermore, when the continuous operation of the self-driving system 100 is difficult, the driver is in charge of addressing the situation.

When the self-driving level is LV2 or less, the driver is in charge of the self-driving. When the self-driving level is level 3 or more (described below), the responsible for the self-driving is switched to the self-driving system 100.

When the self-driving level is level 3 (hereinafter occasionally referred to as "LV3"), the self-driving system 100 performs all the dynamic driving tasks in the limited domain. Accordingly, the driver (the occupant who sits in the driver's sheet) is not required to perform any driving operation. In LV3, the self-driving system 100 is required to monitor safe driving. However, when the continuous operation of the self-driving system 100 is difficult, the driver is in charge of addressing the situation.

When the self-driving level is level 4 (hereinafter occasionally referred to as "LV4"), the self-driving system 100 performs all the dynamic driving tasks and the response to the case where its continuous operation is difficult in the limited domain. Also in LV4, the self-driving system 100 is required to monitor safe driving.

When the self-driving level is level 5 (hereinafter occasionally referred to as "LV5"), the self-driving system 100 performs, unlimitedly, all the dynamic driving tasks and the response to the case where its continuous operation is difficult (that is, not only in the limited domain).

The limited domain in the level of LV3 or more is also called as an operational design domain (ODD), which indicates specific conditions related to traveling environment in design. This traveling environment in design is a premise for the normal operation of the self-driving system 100. The following are examples of the traveling environment conditions included in the ODD:

Road conditions (highway, normal road, number of lanes, existence/non-existence of the lane, exclusive road for the self-driving vehicle, etc.);

Geographical conditions (setting of urban area/mountainous area, etc.);

Environmental conditions (weather, nighttime limit, etc.); and

Other conditions (speed limit, necessity of infrastructure cooperation such as traffic light information, limitation of the route to the specified one, necessity of a security personnel as a fellow passenger, etc.).

Therefore, in the case where the traveling of the own vehicle is controlled in LV3 or LV4, when the conditions of ODD are not satisfied in the middle of the above traveling, it is necessary to lower the self-driving level to LV2 or less. In this case, the responsible for the driving is switched from the self-driving system 100 to the driver. Thus, the driver is required to take over the driving operation from the self-driving system 100.

—Air Conditioner Unit—

Figure 2:
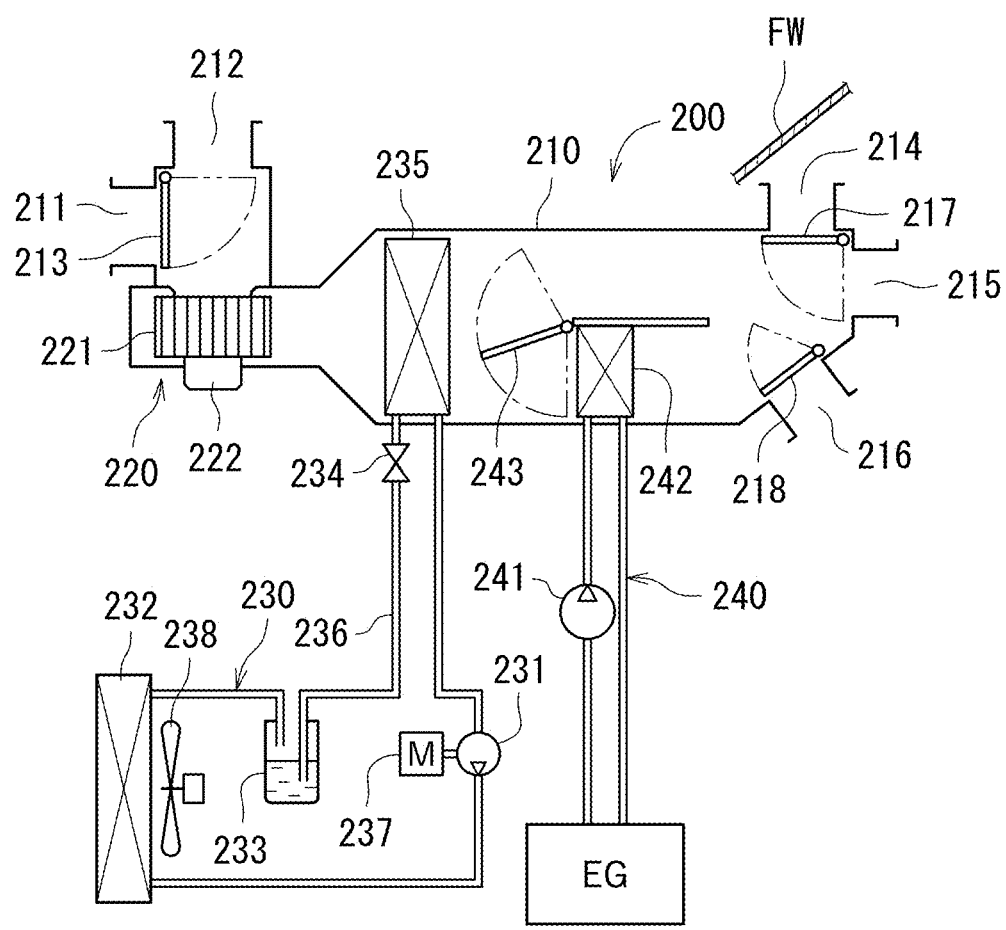
FIG. 2 is a diagram illustrating a schematic configuration of an air conditioner unit mounted on the vehicle according to the embodiments.

Now, an air conditioner unit (air conditioner system) mounted on the vehicle is described. FIG. 2 is a diagram illustrating a schematic configuration of an air conditioner unit 200 mounted on the vehicle according to this embodiment. As shown in FIG. 2, the air conditioner unit 200 includes: an air-conditioning duct 210 that forms an air passage to introduce conditioned air into the cabin; a centrifugal blower 220 (blower for air conditioner) that generates air flow in the air-conditioning duct 210; a refrigerant circulation circuit 230 that cools the air flowing through the air-conditioning duct 210; and a cooling water circuit 240 that heats the air flowing through the air-conditioning duct 210.

The uppermost stream side (windward side) of the air-conditioning duct 210 is a part constituting an air inlet switching box (inside/outside air switching box), which includes: an inside air inlet 211 that introduces cabin-inside air (inside air); and an outside air inlet 212 that introduces cabin-outside air (outside air).

Furthermore, an inside/outside air switching door 213 is pivotably provided inside the inside air inlet 211 and the outside air inlet 212. The inside/outside air switching door 213 is driven by an actuator 213a such as a servomotor (see FIG. 3) so as to switch the air inlet mode between an inside air recirculation mode and an outside air introduction mode.

The lowermost stream side (leeward side) of the air-conditioning duct 210 is a part constituting an air outlet switching box, which includes: a defroster opening 214; a face opening 215; and a foot opening 216.

The air (conditioned air) is blown through the defroster opening 214 to an inner surface of a front window FW of the vehicle. The conditioned air is blown through the face opening 215 to the head and chest of the occupant. The conditioned air is blown through the foot opening 216 to the feet of the occupant.

Furthermore, air outlet switching doors 217 and 218 are pivotably provided inside the openings 214, 215 and 216. The air outlet switching doors 217 and 218 are driven by actuators 217a and 218a such as a servomotor (see FIG. 3) so as to switch the air outlet mode between a face mode, a bi-level (B/L) mode, a foot mode, a foot and defroster (F/D) mode, and defroster mode. In the face mode, the conditioned air is blown only through the face opening 215. In the bi-level mode, the conditioned air is blown respectively through the face opening 215 and the foot opening 216. In the foot mode, the conditioned air is blown only through the foot opening 216. In the foot and defroster mode, the conditioned air is blown respectively through the foot opening 216 and the defroster opening 214. In the defroster mode, the conditioned air is blown only through the defroster opening 214.

The centrifugal blower 220 includes: a blower 221 that is rotatably housed in a scroll case integrally configured with the air-conditioning duct 210; and a blower motor 222a that drives and rotates the blower 221.

Figure 3:
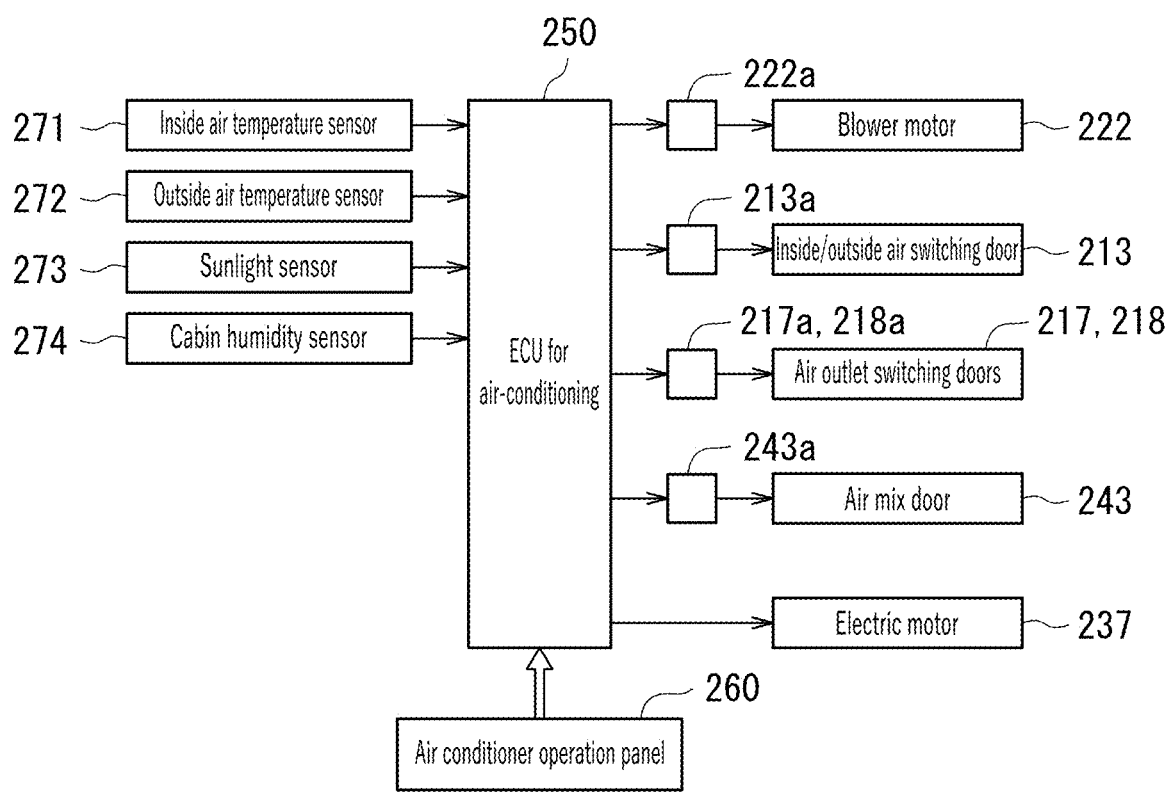
FIG. 3 is a block diagram illustrating a schematic configuration of a control system of the air conditioner unit according to the embodiments.

The blower air volume (rotational speed of the blower 221) by the blower motor 222 is controlled based on blower terminal voltage applied via a blower driving circuit 222a (see FIG. 3).

The refrigerant circulation circuit 230 includes: a compressor 231; a condenser 232 into which a refrigerant discharged from a discharge port of the compressor 231 flows; a receiver 233 that subjects the condensed/liquefied refrigerant to gas-liquid separation so as to flow only the liquid refrigerant downstream; an expansion valve 234 that decompresses and expands the liquid refrigerant; an evaporator 235 that evaporates/gasifies the decompressed and expanded refrigerant; and a refrigerant pipes 236 that circularly connects the above elements.

The evaporator 235 is disposed at a part of the air passage in the longer direction so as to cover whole the cross-section of the air passage in the shorter direction.

The compressor 231 compresses and then discharges the sucked refrigerant. It is configured as an electric compressor driven by an electric motor 237. The electric motor 237 is an AC motor whose operation (rotational speed) is controlled by alternative-current voltage output from an inverter (not shown). The motive power generated by the operation of the electric motor 237 is transmitted to the compressor 231, which allows the refrigerant to circulate through the refrigerant circulation circuit 230. Thus, the refrigerant is evaporated/gasified by the evaporator 235 so that the air is cooled and dehumidified. When the electric motor 237 is stopped, the compressor 231 is also stopped. As a result, the refrigerant does not circulate through the refrigerant circulation circuit 230.

The condenser 232 condenses/liquefies the refrigerant compressed by the compressor 231. More specifically, the condenser 232 condenses/liquefies the refrigerant by exchanging heat between the refrigerant, and outside air blown from a cooling fan 238 and traveling wind (when the vehicle is traveling).

The cooling water circuit 240 is a circuit through which the cooling water heated in a water jacket of an engine EG circulates by a water pump 241. The cooling water circuit 240 includes a heater core 242.

Inside the heater core 242, engine cooling water flows, which is used as a heat source for heating the air. Apart from the above heater core 242, the cooling water circuit 240 also includes: a radiator that releases the heat of the engine cooling water into the atmosphere; and a thermostat that switches the circulating path of the cooling water (both elements are not shown). Since the configurations of these elements are well known, the description thereof is omitted here.

The heater core 242 is disposed in a part of the air passage downstream of the evaporator 235 (for example, disposed at the part of the air passage in the longer direction so as to cover the lower half of the cross-section of the air passage in the shorter direction).

Also, an air mix door 243 is pivotably provided upstream of the heater core 242. The air mix door 243 is driven by an actuator 243a such as a servomotor (see FIG. 3) so as to stop at a certain position between a MAX-COOL position to make the air completely bypass the heater core 242 and a MAX-HOT position to make the air completely pass through the heater core 242. Thus, the air mix door 243 adjusts the temperature of the air blowing into the cabin by changing the ratio of the air volume passing through the heater core 242 and the air volume bypassing the heater core 242 according to its stopping position.

As shown in FIG. 3, an ECU 250 for air-conditioning controls, in response to an air-conditioning request from the cabin, the compressor 231 (electric motor 237) and the actuators 213a, 217a, 218a and 243a of the air conditioner unit 200. The ECU 250 for air-conditioning also includes, similarly to the ECU 110 for self-driving: a processor such as a CPU; a ROM to store control programs; a RAM to temporarily store data; and an input/output port.

As shown in FIG. 3, to the ECU 250 for air-conditioning, the following are input: switch signals from various switches on an air conditioner operation panel (air conditioner operation section) 260 provided in front part in the cabin (i.e. instrument panel); and sensor signals from various sensors.

Figure 4:
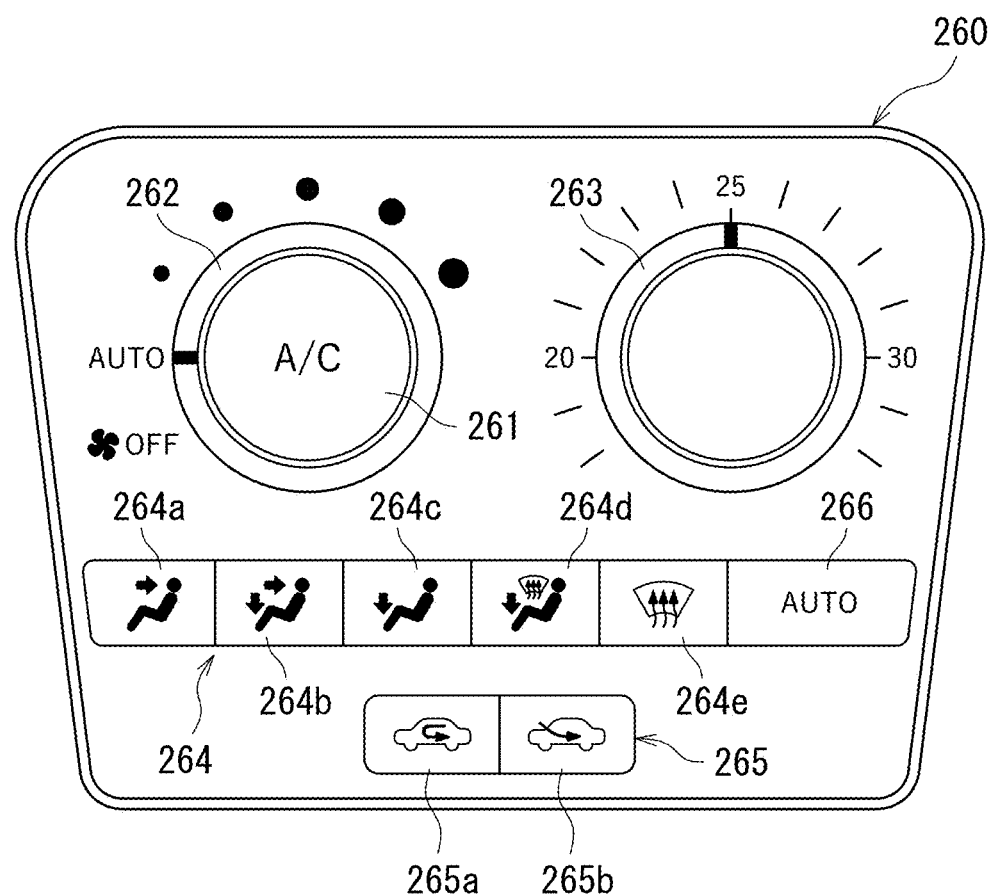
FIG. 4 is a diagram indicating an example of an air conditioner operation panel of the air conditioner unit according to the embodiments.

FIG. 4 is a diagram indicating an example of the air conditioner operation panel 260. As shown in FIG. 4, the air conditioner operation panel 260 includes: an air conditioner switch (compressor operation switch) 261; an air volume control dial 262; a temperature control dial 263; an air outlet selection switch 264, a recirculation/fresh air selector switch 265; and an automatic operation switch 266.

The air conditioner switch 261 is a switch for switching ON/OFF of the compressor 231. Here, it is a switch with "A/C" display, which is provided inside the air volume control dial 262. The air volume control dial 262 is a dial for adjusting air volume blown from the air conditioner unit 200. The temperature control dial 263 is a dial for adjusting the preset temperature (preset temperature of the conditioned air) of the air conditioner unit 200. The recirculation/fresh air selector switch 265 is a switch for switching the air conditioner unit 200 between the outside air introduction state and the inside air recirculation state, which includes a recirculation mode switch 265*a* and a fresh air introduction mode switch 265*b*.

The air outlet selection switch 264 is a switch for selecting the air outlet of the air conditioner unit 200. In this embodiment, it includes a plurality of selection switches 264*a* to 264*e* corresponding to the above-described air outlet modes. That is, the air outlet selection switch 264 includes: a face mode switch 264*a* that is pressed when the face mode is selected; a bilevel mode switch 264*b* that is pressed when the bi-level mode is selected; a foot mode switch 264*c* that is pressed when the foot mode is selected; a foot and defroster mode switch 264*d* that is pressed when the foot and defroster mode is selected; and a defroster mode switch 264*e* that is pressed when the defroster mode is selected.

The automatic operation switch 266 is a switch that is operated when automatically controlling the air conditioner unit 200. When the automatic operation switch 266 is turned ON, the air conditioner unit 200 is automatically controlled based on the cabin temperature, the preset temperature set by the temperature control dial 263, and the like.

As shown in FIG. 3, examples of the sensors connected to the ECU 250 for air-conditioning include: an inside air temperature sensor 271 that detects the cabin temperature; an outside air temperature sensor 272 that detects the temperature of the outside air; a sunlight sensor 273 that detects an amount of solar radiation with which the cabin is irradiated; and a cabin humidity sensor 274 that detects the cabin humidity.

—ECU for Anti-Fog Control—

Now, an ECU for anti-fog control is described, which is a characteristic feature of this embodiment. The ECU for anti-fog control performs control to adjust: the anti-fog performance of the air conditioner unit 200; and the self-driving level, in cooperation with the ECU 250 for air-conditioning and the ECU 110 for self-driving. The anti-fog performance is a level of anti-fog function preventing fogging of the front window FW (hereinafter occasionally referred to as a "window", simply). Hereinafter, a configuration is described, in which respective function sections of the ECU for anti-fog control (described later) are independent from both the ECU 250 for air-conditioning and the ECU 110 for self-driving. However, these function sections may be partly or completely incorporated in the ECU 250 for air-conditioning or the ECU 110 for self-driving.

Figure 5:
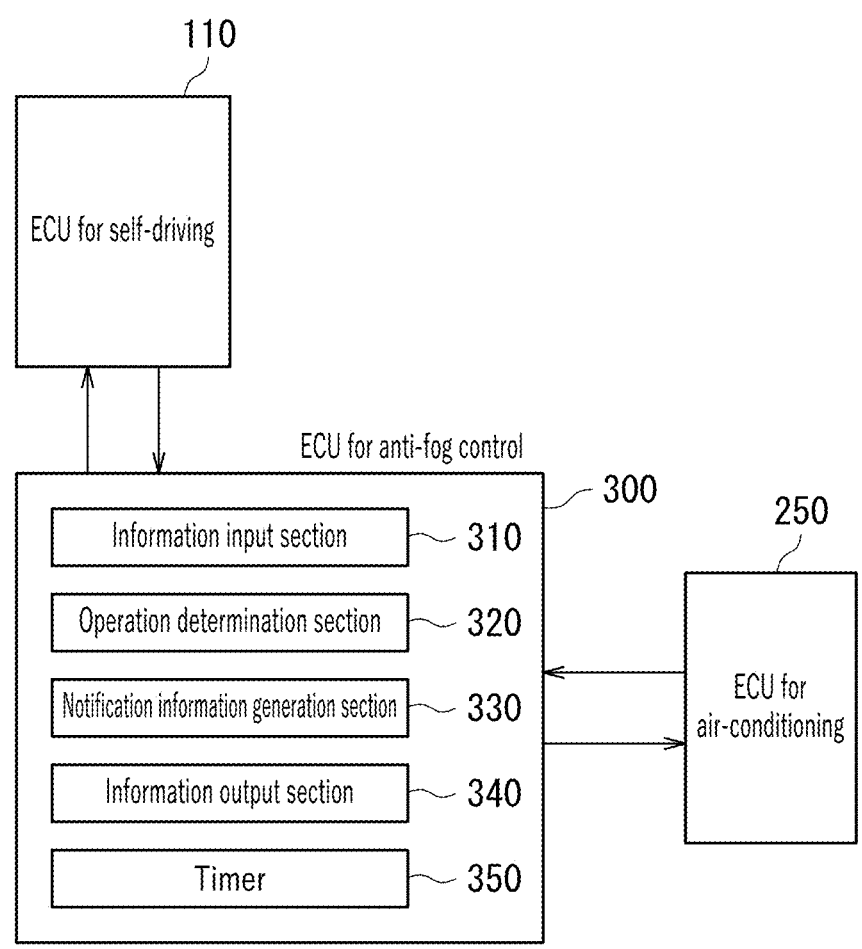
FIG. 5 is a functional block diagram of a control system related to an ECU for anti-fog control according to a first embodiment.

FIG. 5 is a functional block diagram of a control system related to an ECU 300 for anti-fog control. The ECU 300 for anti-fog control also includes, similarly to the ECU 110 for self-driving and the ECU 250 for air-conditioning: a processor such as a CPU; a ROM to store control programs; a RAM to temporarily store data; and an input/output port.

The ECU 300 for anti-fog control includes, as function sections to be executed by the control programs: an information input section 310; an operation determination section 320; a notification information generation section 330; an information output section 340; and a timer 350.

The information input section 310 receives information on the self-driving from the ECU 110 for self-driving and information on the air-conditioning operation from the ECU 250 for air-conditioning.

The information on the self-driving received from the ECU 110 for self-driving is information on the current self-driving level (i.e. information regarding which is the current level out of LV0 to LV5). The information on the air-conditioning operation received from the ECU 250 for air-conditioning is information on the current state of the air-conditioning operation (i.e. information on the air inlet mode, information on the air outlet mode, information on the air conditioner preset temperature, and information on ON/OFF of the compressor 231), and information on operation of the air conditioner operation panel 260.

When the operation determination section 320 receives the information on operation of the air conditioner operation panel 260 from the information input section 310, the operation determination section 320 determines whether the operation of the air conditioner operation panel 260 has a possibility to lower the anti-fog performance (anti-fog performance contributing to prevention of fogging of the window) of the air conditioner unit 200. A detailed description is given below.

Figure 6:
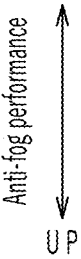
FIG. 6 is a table indicating a relationship between an operation of the air conditioner operation panel and an anti-fog performance when the air conditioner unit is controlled by the operation.

FIG. 6 is a table indicating a relationship between the operation of the air conditioner operation panel 260 and the anti-fog performance when the air conditioner unit 200 is controlled by the operation. In FIG. 6, as the respective states of the items (the air inlet mode, the air outlet mode, the air conditioner preset temperature, and the compressor 231) are indicated on the lower side in the table, the anti-fog performance is improved. Specifically, as to the relation between the air inlet mode and the anti-fog performance, the anti-fog performance becomes higher in the outside air introduction mode than in the inside air recirculation mode. As to the relation between the air outlet mode and the anti-fog performance, the anti-fog performance is reduced in the face mode and the bi-level mode compared to the other air outlet modes. Furthermore, the anti-fog performance becomes higher in the mode in the order of: the foot mode; the foot and defroster mode; and the defroster mode. As to the relation between the air conditioner preset temperature and the anti-fog performance, the anti-fog performance becomes higher as the air conditioner preset temperature becomes higher. In addition, the anti-fog performance becomes higher when the compressor 231 is in the ON state than when the compressor 231 is in the OFF state.

When the operation determination section 320 receives the information on operation of the air conditioner operation panel 260 from the information input section 310, the operation determination section 320 determines whether the operation of the air conditioner operation panel 260 has a possibility to improve the anti-fog performance of the air conditioner unit 200 or has a possibility to lower the anti-fog performance, based on FIG. 6. In other words, the ROM stores determination map corresponding to FIG. 6, and the operation determination section 320 determines, when the air conditioner operation panel 260 is operated, whether this operation has the possibility to improve the anti-fog performance of the air conditioner unit 200 or has the possibility to lower the anti-fog performance, using this determination map.

For example, when the recirculation mode switch 265*a* is operated in the state in which the air inlet mode is the outside air introduction mode, it is determined that the operation possibly lowering the anti-fog performance of the air conditioner unit 200 has been performed. Also, when the foot mode switch 264*c* is operated in the state in which the air outlet mode is the defroster mode, it is determined that the operation possibly lowering the anti-fog performance of the air conditioner unit 200 has been performed. Also, when the air conditioner preset temperature is set to 23° C. by operating the temperature control dial 263 in the state in which the air conditioner preset temperature is 25° C., it is determined that the operation possibly lowering the anti-fog performance of the air conditioner unit 200 has been performed. Also, when the compressor 231 is turned OFF by operating the air conditioner switch 261 in the state in which the compressor 231 is in the ON state, it is determined that the operation possibly lowering the anti-fog performance of the air conditioner unit 200 has been performed.

The notification information generation section 330 receives the determination result of the operation determination section 320, and generates, based on the determination result, notification information to transmit the notification (notification derived from the operation of the air conditioner operation panel 260) from the HMI 190 to the occupant.

More specifically, when the operation of the air conditioner operation panel 260 has the possibility to improve the anti-fog performance of the air conditioner unit 200, the notification information generation section 330 does not generate the notification information. On the other hand, when the operation of the air conditioner operation panel 260 has the possibility to lower the anti-fog performance of the air conditioner unit 200, the notification information generation section 330 generates: information to notify the occupant of the fact that the operation of the air conditioner operation panel 260 by the occupant possibly lowers the anti-fog performance of the air conditioner unit 200; and information to preannounce to the occupant that the self-driving level is lowered after elapse of a predetermined time (i.e. information to preannounce that the responsible for the driving is switched from the self-driving system 100 to the driver). This generation of the information to preannounce that the self-driving level is lowered after elapse of the predetermined time is to meet (to comply with) the law providing that the self-driving level should not be maintained in LV3 in the case where the fogging of the window may occur (it is necessary to switch the level from LV3 to LV2).

The information output section 340 outputs the information generated by the notification information generation section 330 to the HMI 190 via the ECU 110 for self-driving. Thus, the HMI 190 notifies the occupant of: the information that the operation of the air conditioner operation panel 260 by the occupant possibly lowers the anti-fog performance of the air conditioner unit 200; and the information that preannounces the lowering of the self-driving level after elapse of the predetermined time. For example, the following text is displayed on the display, or is emitted as a voice from the speaker: "There is a possibility of fogging of the window due to the performed air conditioner setting operation. If you prefer maintaining the self-driving, please restore the air conditioner setting to the original state or operate the automatic operation switch within 5 seconds". The time here is not limited to 5 seconds. It may be appropriately set. Also, the means for notifying the information is not limited to the HMI 190 connected to the ECU 110 for self-driving. The display and the speaker may be connected to the ECU 300 for anti-fog control such that the information is notified by this display and this speaker.

The timer 350 starts counting from the time point when the notification of the information is performed, and the time is up after elapse of a predetermined time (for example, a few seconds). When the time is up, the timer 350 transmits the time-up information to the information output section 340 and the ECU 110 for self-driving. The period of time that is counted up by the timer 350 is set to equivalent to the time indicated in the notification information (5 seconds) or to the time slightly longer than the indicated time.

The information output section 340 that received the above time-up information generates the information that the self-driving level will be lowered to output the generated information to the HMI 190 via the ECU 110 for self-driving. In this way, the HMI 190 notifies the information that the self-driving level will be lowered. For example, the following text is displayed on the display, or is emitted as a voice from the speaker: "The self-driving level is now switched to LV2". Also, the ECU 110 for self-driving, which received the information that the time counted by the timer 350 is up, switches the self-driving level to LV2 substantially simultaneously with the timing of notifying the lowering of the self-driving level or with a slight time delay.

Also, when the above operation of the air conditioner operation panel 260 (the operation possibly lowering the anti-fog performance of the air conditioner unit 200) is cancelled before the time counted by the timer 350 is up, the notification by the HMI 190 is terminated. In this case, the current self-driving level (LV3) is maintained. The cancellation of the operation of the air conditioner operation panel 260 is an operation opposite to the operation possibly lowering the anti-fog performance of the air conditioner unit 200 (for example, the operation of the fresh air introduction mode switch 265b in the case where the recirculation mode switch 265a is operated in the state in which the air inlet mode is the outside air introduction mode). Also, the operation of the automatic operation switch 266 is treated as the cancellation of the operation of the air conditioner operation panel 260 (the operation possibly lowering the anti-fog performance of the air conditioner unit 200).

—Anti-Fog Control—

Figure 7:
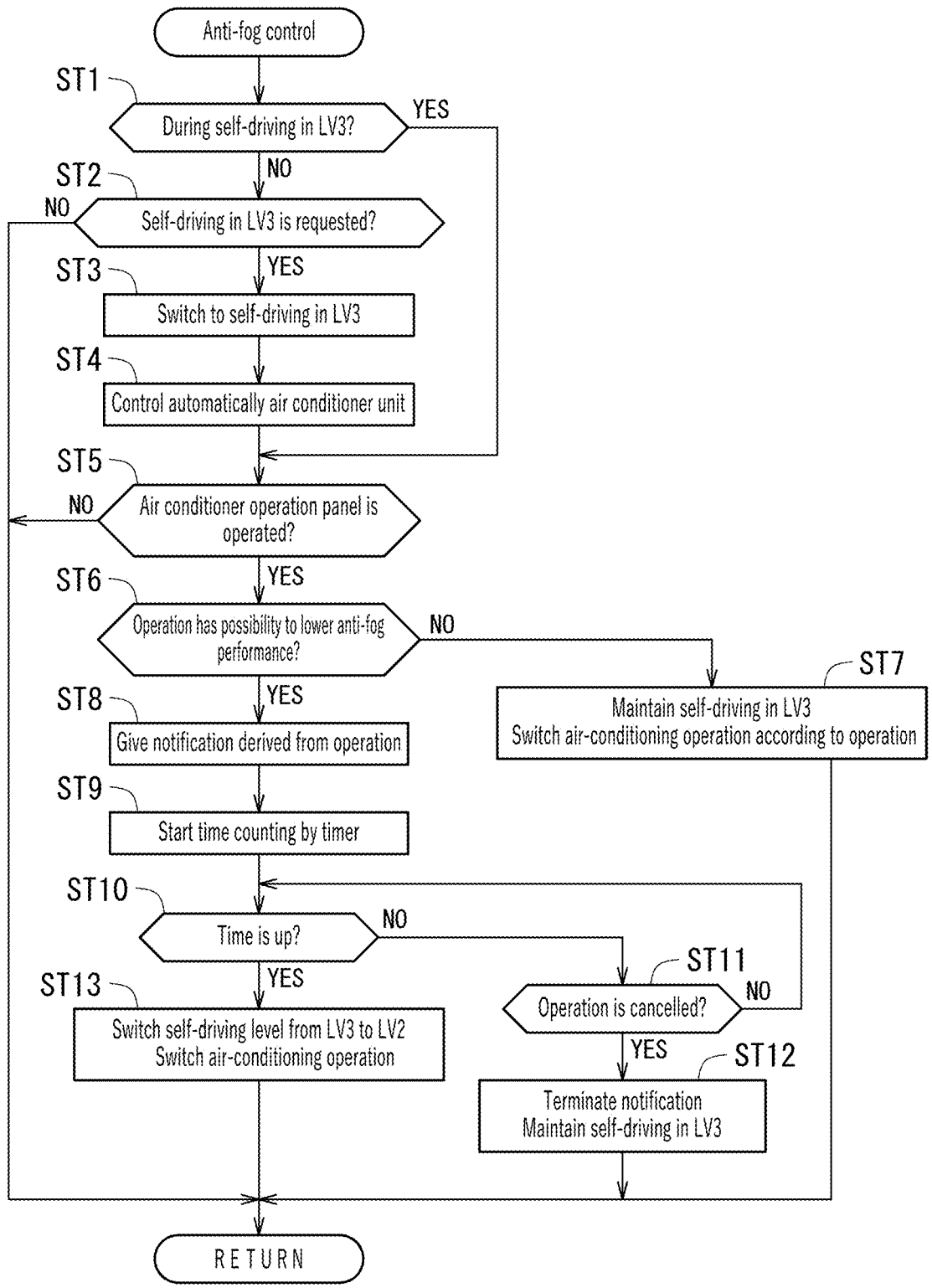
FIG. 7 is a flowchart indicating a processing procedure of the anti-fog control according to the first embodiment.

Here, the anti-fog control in the vehicle as configured above is described. FIG. 7 is a flowchart indicating a processing procedure of the anti-fog control according to this embodiment. In this flowchart, the case where the driving state of the vehicle is switched between the self-driving in LV 3 and the self-driving in LV2 is exemplarily explained. However, the switching is not limited thereto. It is sufficient to switch the operating state between: the self-driving in LV3 or more (self-driving in any level of LV3, LV4 and LV5); the self-driving in LV2 or less (self-driving in either level of LV1 and LV2); and the driving in LV0 (the manual driving mode). Switching the operating state to the self-driving in either LV2 or LV1 corresponds to "lowering the self-driving degree" in the present invention, and switching the driving state to the driving in LV0 corresponds to "termination of the self-driving" in the present invention.

In step ST1, it is determined whether the current driving state of the vehicle is the self-driving in LV3. If the driving state is not the self-driving in LV3 (for example, the self-driving in LV2 or the like), and thus it is determined to be "NO" in step ST1, the procedure advances to step ST2 where it is determined whether the self-driving in LV3 is requested from the occupant. When the self-driving in LV3 is not requested and thus it is determined to be "NO" in step ST2, the procedure returns.

On the other hand, when the self-driving in LV3 is requested from the occupant and thus it is determined to be "YES" in step ST2, the procedure advances to step ST3 where the driving state is switched to the self-driving in LV3 by the self-driving system 100. When the driving state is switched to the self-driving in LV3 in this way, in step ST4, the air conditioner unit 200 is automatically controlled (automatic operation). That is, in the case where the air conditioner unit 200 is manually operated in the stage before the switching to the self-driving in LV3, the conditioning unit 200 is switched to the automatic operation.

The automatic operation in this case is different depending on the season and the traveling area of the vehicle.

Specifically, when the air conditioner preset temperature is 25° C. in the summer time, for example, the air inlet mode is the inside air recirculation mode, the air outlet mode is the face mode, and the compressor 231 is in the "ON" state. When the vehicle is traveling in the urban area in the wintertime and also the air conditioner preset temperature is 25° C., for example, the air inlet mode is the outside air introduction mode, the air outlet mode is the foot mode, and the compressor 231 is in the "ON" state. Also, when the vehicle is traveling on the highway in the wintertime and also the air conditioner preset temperature is 25° C., for example, the air inlet mode is the outside air introduction mode, the air outlet mode is the foot and defroster mode, and the compressor 231 is in the "ON" state. The reason why the air outlet mode is the foot mode when the vehicle is traveling in the urban area while the air outlet mode is the foot and defroster mode when the vehicle is traveling on the highway is because the window is likely to be fogged due to fall of the glass temperature when the vehicle is traveling on the highway. Also, as to the method for distinguishing between the traveling in the urban area and the traveling on the highway, a method can be exemplarily given, in which they are distinguished from each other by the vehicle velocity and the duration of the traveling with this velocity. Alternatively, they may be distinguished from each other by the positional information on the own vehicle received by the GPS receiver 140 and the map database 150.

After the air conditioner unit 200 is automatically operated, the procedure advances to step ST5 where it is determined whether the air conditioner operation panel 260 is operated. This determination is performed based on whether the operation determination section 320 receives information on operation of the air conditioner operation panel 260 from the information input section 310. When the air conditioner operation panel 260 is not operated and thus it is determined to be "NO" in step ST5, the procedure returns. In this case, since the operating state is already switched to the self-driving in LV3, it is determined to be "YES" in step ST1, and the procedure returns to step ST5. That is, it is determined whether the air conditioner operation panel 260 is operated or not on the condition that the self-driving in LV3 is continuously performed.

On the other hand, when the air conditioner operation panel 260 is operated and thus it is determined to be "YES" in step ST5, the procedure advances to step ST6 where it is determined whether the operation of the air conditioner operation panel 260 has a possibility to lower the anti-fog performance of the air conditioner unit 200. As described above referring to FIG. 6, it is determined that the operation has a possibility to lower the anti-fog performance of the air conditioner unit 200 when any of the settings of the air inlet mode, the air outlet mode, the air conditioner preset temperature and the compressor 231 is changed to the state indicated in the upper part of the table of FIG. 6.

In the case where the operation of the air conditioner operation panel 260 does not have the possibility to lower the anti-fog performance of the air conditioner unit 200 (for example, when the operation has the possibility to improve the anti-fog performance of the air conditioner unit 200, etc.) and thus it is determined to be "NO" in step ST6, the procedure advances to step ST7 where the self-driving in LV3 is maintained and the air-conditioning operation state of the air conditioner unit 200 is switched according to the operation of the air conditioner operation panel 260. Thus, the procedure returns.

On the other hand, in the case where the operation of the air conditioner operation panel 260 has the possibility to lower the anti-fog performance of the air conditioner unit 200 and thus it is determined to be "YES" in step ST6, the procedure advances to step ST8 where the HMI 190 notifies the occupant of: the information that the operation of the air conditioner operation panel 260 by the occupant possibly lowers the anti-fog performance of the air conditioner unit 200; and the information that preannounces the lowering of the self-driving level after elapse of the predetermined time (i.e. the notification derived from the operation is given). As described specifically above, the following text is displayed on the display, or is emitted as a voice from the speaker: "There is a possibility of fogging of the window due to the performed air conditioner setting operation. If you prefer maintaining the self-driving, please restore the air conditioner setting to the original state or operate the automatic operation switch within 5 seconds".

After the notification is performed, the procedure advances to step ST9 where the time counting is started by the timer 350. After the time counting by the timer 350 is started, the procedure advances to step ST10 where it is determined whether the predetermined time elapses and the time counted by the timer 350 is up.

When the time counted by the timer 350 is not yet up and thus it is determined to be "NO", the procedure advances to step ST11 where it is determined whether the operation of the air conditioner operation panel 260 (i.e. the operation having the possibility to lower the anti-fog performance of the air conditioner unit 200) performed in step ST5 is cancelled. That is, it is determined that the cancellation is performed when the operation opposite to the operation possibly lowering the anti-fog performance of the air conditioner unit 200 is performed or the automatic operation switch 266 is operated.

When the operation of the air conditioner operation panel 260 is cancelled (cancelled before the time counted by the timer 350 is up) and thus it is determined to be "YES" in step ST11, the procedure advances to step ST12 where the notification by the HMI 190 (i.e. notification of the information that the operation of the air conditioner operation panel 260 by the occupant possibly lowers the anti-fog performance of the air conditioner unit 200 and the information that preannounces lowering of the self-driving level after elapse of the predetermined time) is terminated, and the self-driving in LV3 is maintained. Thus, the procedure returns. That is, the operating state of the air conditioner unit 200 before the air conditioner operation panel 260 is operated is continued and the self-driving in LV3 is maintained.

On the other hand, when the time counted by the timer 350 is up and thus it is determined to be "YES" in step ST10 (that is, when the time counted by the timer 350 is up while the operation of the air conditioner operation panel 260 is not cancelled), the procedure advances to step ST13 where the notification that the self-driving level will be switched from LV3 to LV2 is given, and after that the self-driving level is switched to LV2. In this case, the operating state of the air conditioner unit 200 is in response to the operation of the air conditioner operation panel 260. For example, when the foot mode switch 264*c* is operated in the state in which the air outlet mode is the defroster mode and furthermore when the time counted by the timer 350 is up, the self-driving level is switched from LV3 to LV2 and furthermore the air outlet mode of the air conditioner unit 200 is switched to the foot mode.

The above procedure is repeatedly performed.

Effects of Embodiment

In the embodiment as described above, it is possible for the occupant who receives the notification from the HMI 190 to recognize that the operation of the air conditioner operation panel 260 performed by him/herself has the possibility to: affect the anti-fog performance of the air conditioner unit 200 (i.e. lower the anti-fog performance); and affect the self-driving of the vehicle (i.e. switch the self-driving level from LV3 to LV2). Thus, when the occupant recognizes that the anti-fog effect by the air conditioner unit 200 may not be maintained due to the operation of the air conditioner operation panel 260 performed by him/herself, the occupant can select, of his/her own will, to maintain the anti-fog performance of the air conditioner unit 200 (give priority to prevention of the fogging of the window) by restoring the operating state to the original state, or to establish the air-conditioning operation in response to his/her performed operation of the air conditioner operation panel 260 (give priority to comfortability by air-conditioning). As a result, it is possible to prevent decrease of the anti-fog performance of the air conditioner unit 200 against the occupant's own will.

More specifically, when the occupant who receives the notification from the HMI 190 recognizes that the operation of the air conditioner operation panel 260 performed by him/herself has the possibility to lower the anti-fog performance of the air conditioner unit 200, the occupant can understand that it is necessary to perform the cancel operation of his/her operation of the air conditioner operation panel 260 (i.e. restoration of the air conditioner setting to the original state) if he/she wants to maintain the operating state before his/her operation (i.e. the operating state in which the air conditioner unit 200 is operated to exert the anti-fog performance according to the self-driving level). That is, it is possible to maintain the operating state of the air conditioner operation panel 260 before his/her operation by performing the cancel operation of his/her operation of the air conditioner operation panel 260. On the other hand, if the occupant wants to realize his/her operation of the air conditioner operation panel 260 (i.e. realize the air-conditioning operation according to his/her operation of the air conditioner operation panel 260), it is possible to establish the air-conditioning operation according to his/her operation of the air conditioner operation panel 260 by not performing the cancel operation of his/her operation of the air conditioner operation panel 260. Thus, by notifying the occupant of the information, it is possible to control the operating state reflecting the occupant's own will.

Also in this embodiment, the notification information from the HMI 190 includes the information that preannounces the lowering of the self-driving level after elapse of the predetermined time (i.e. switching the self-driving level from LV3 to LV2). In this way, it is possible for the occupant to select, of his/her own will, to maintain the self-driving in the current self-driving level by performing the cancel operation of his/her operation of the air conditioner operation panel 260, or to establish the air-conditioning operation according to his/her operation of the air conditioner operation panel 260 even if the self-driving in the current self-driving level is no longer performed (i.e. the self-driving level is lowered) by not performing the cancel operation of his/her operation of the air conditioner operation panel 260. In this way also, by notifying the occupant of the information, it is possible to control the operating state reflecting the occupant's own will.

Second Embodiment

Secondly, a second embodiment is described. In this embodiment, the behavior when the operation of the air conditioner operation panel 260 is performed (i.e. when the operation having the possibility to lower the anti-fog performance of the air conditioner unit 200 is performed) is different from that in the first embodiment. Therefore, this difference from the first embodiment is mainly described here.

Figure 8:
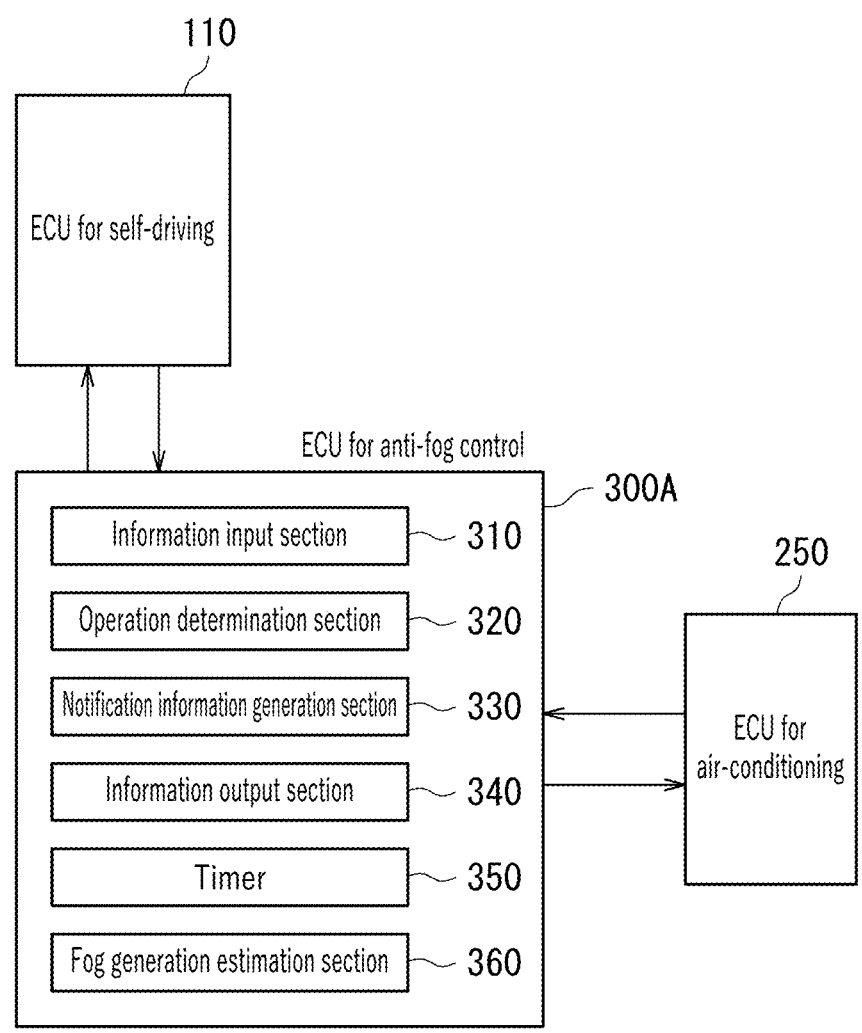
FIG. 8 is a functional block diagram of the control system related to the ECU for anti-fog control according to a second embodiment.

FIG. 8 is a functional block diagram of the control system related to an ECU 300A for anti-fog control according to this embodiment. The ECU 300A for anti-fog control according to this embodiment includes, as function sections to be executed by the control programs: the information input section 310; the operation determination section 320; a fog generation estimation section 360; the notification information generation section 330; the information output section 340; and the timer 350.

The information input section 310 receives information on the self-driving from the ECU 110 for self-driving and information on the air-conditioning operation from the ECU 250 for air-conditioning. The information on the air-conditioning operation received by the information input section 310 from the ECU 250 for air-conditioning includes, apart from the various kinds of information in the first embodiment as described above, information on the cabin humidity detected by the cabin humidity sensor 274. Also in this embodiment, a glass temperature sensor (not shown) is provided to detect the temperature of the inner surface of the front window FW. The information input section 310 also receives, from the glass temperature sensor, temperature information (i.e. information on the temperature of the inner surface of the front window FW).

When the operation determination section 320 receives the information on operation of the air conditioner operation panel 260 from the information input section 310, in the same way as the first embodiment, the operation determination section 320 determines whether the operation of the air conditioner operation panel 260 has a possibility to lower the anti-fog performance of the air conditioner unit 200.

The fog generation estimation section 360 receives: determination information from the operation determination section 320 (i.e. determination information on whether the operation of the air conditioner operation panel 260 has the possibility to lower the anti-fog performance of the air conditioner unit 200); information on the cabin humidity received by the information input section 310 (i.e. information on the cabin humidity detected by the cabin humidity sensor 274); and information on the temperature of the inner surface of the front window FW, which is detected by the glass temperature sensor.

When the determination information from the operation determination section 320 is the determination information that the operation of the air conditioner operation panel 260 has the possibility to lower the anti-fog performance of the air conditioner unit 200, the fog generation estimation section 360 estimates whether the fogging of the window occurs or not based on the information on the cabin humidity and the information on the temperature of the inner surface of the front window FW. More specifically, the fog generation estimation section 360 estimates whether the fogging of the window occurs or not by calculating the dew point in the cabin based on the cabin humidity and by determining whether the temperature of the inner surface of the front window FW reaches the dew point (reaches the temperature of the dew point or less).

The notification information generation section 330 receives the estimation result of the fog generation estimation section 360 (i.e. estimation result whether the fogging of the window occurs or not), and generates, based on the above result, notification information to transmit the notification from the HMI 190 to the occupant.

More specifically, when the operation of the air conditioner operation panel 260 has the possibility to improve the anti-fog performance of the air conditioner unit 200, the notification information generation section 330 does not generate the notification information. Also, even when the operation of the air conditioner operation panel 260 has the possibility to lower the anti-fog performance of the air conditioner unit 200, if the estimation result of the fog generation estimation section 360 is a result that the fogging of the window is not likely to occur, the notification information generation section 330 does not generate the notification information. On the other hand, when the operation of the air conditioner operation panel 260 has the possibility to lower the anti-fog performance of the air conditioner unit 200, and furthermore when the estimation result of the fog generation estimation section 360 is a result that the fogging of the window occurs, the notification information generation section 330 generates: information to notify the occupant of the fact that the operation of the air conditioner operation panel 260 by the occupant possibly lowers the anti-fog performance of the air conditioner unit 200; and information to preannounce to the occupant that the self-driving level is lowered after elapse of a predetermined time (i.e. information to preannounce that the responsible for the driving is switched from the self-driving system 100 to the driver).

Since the functions of the information output section 340 and the timer 350 are the same as those in the first embodiment described above, the description is omitted here.

Figure 9:
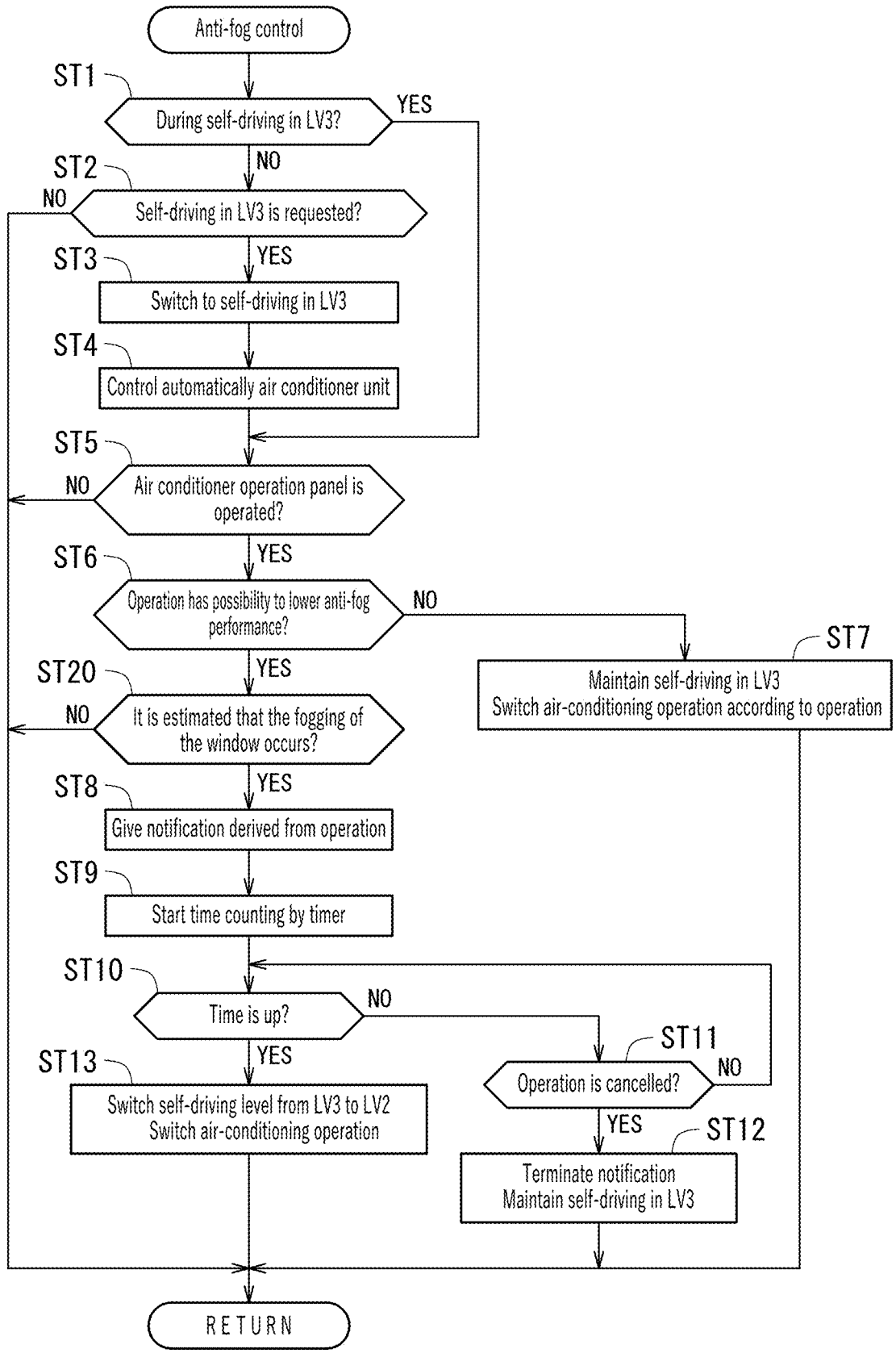
FIG. 9 is a flowchart indicating the processing procedure of the anti-fog control according to the second embodiment.

FIG. 9 is a flowchart indicating the processing procedure of the anti-fog control according to this embodiment. In FIG. 9, the steps each performing the same processing as that in the flowchart of FIG. 7 in the first embodiment have the same step numbers, and the description thereof is omitted.

The respective processing steps in step ST1 to step ST7 are the same as those in the first embodiment as described above.

When the operation of the air conditioner operation panel 260 has the possibility to lower the anti-fog performance of the air conditioner unit 200 and thus it is determined to be "YES" in step ST6, the procedure advances to step ST20 where it is estimated whether the fogging of the window occurs or not based on the information on the cabin humidity and the information on the temperature of the inner surface of the front window FW. This is an estimation operation performed by the fog generation estimation section 360. When it is estimated that the fogging of the window does not occur and thus it is determined to be "NO" in step ST20, the procedure returns.

On the other hand, when it is estimated that the fogging of the window occurs and thus it is determined to be "YES" in step ST 20, the procedure advances to step ST8 where the HMI 190 notifies the occupant of: the information that the operation of the air conditioner operation panel 260 by the occupant possibly lowers the anti-fog performance of the air conditioner unit 200 and possibly generates the fogging of the window; and the information that preannounces the lowering of the self-driving level after elapse of the predetermined time (i.e. notification derived from the operation is given). As described above, the following text is displayed on the display, or is emitted as a voice from the speaker: "There is a possibility of fogging of the window due to the performed air conditioner setting operation. If you prefer maintaining the self-driving, please restore the air conditioner setting to the original state or operate the automatic operation switch within 5 seconds".

The respective processing steps in step ST9 and after are the same as those in the first embodiment as described above. The above procedure is repeatedly performed.

In this embodiment, the HMI 190 notifies the occupant of the information (specifically, information that the fogging of the window occurs and that preannounces the lowering of the self-driving level after elapse of the predetermined time) when the operation of the air conditioner operation panel 260 by the occupant possibly lowers the anti-fog performance of the air conditioner unit 200, and in addition when it is estimated that the fogging of the window occurs. Thus, even when the operation of the air conditioner operation panel 260 by the occupant has the possibility to lower the anti-fog performance of the air conditioner unit 200, if the cabin environment (for example, the cabin humidity) is in the state where the fogging of the window is not likely to occur, the above notification is not given. Therefore, it is possible to avoid giving the notification beyond the necessity.

Third Embodiment

Next, a third embodiment is described. In this embodiment also, the behavior when the operation of the air conditioner operation panel 260 is performed (i.e. when the operation having the possibility to lower the anti-fog performance of the air conditioner unit 200 is performed) is different from that in the first embodiment. Therefore, this difference from the first embodiment is mainly described here.

Figure 10:
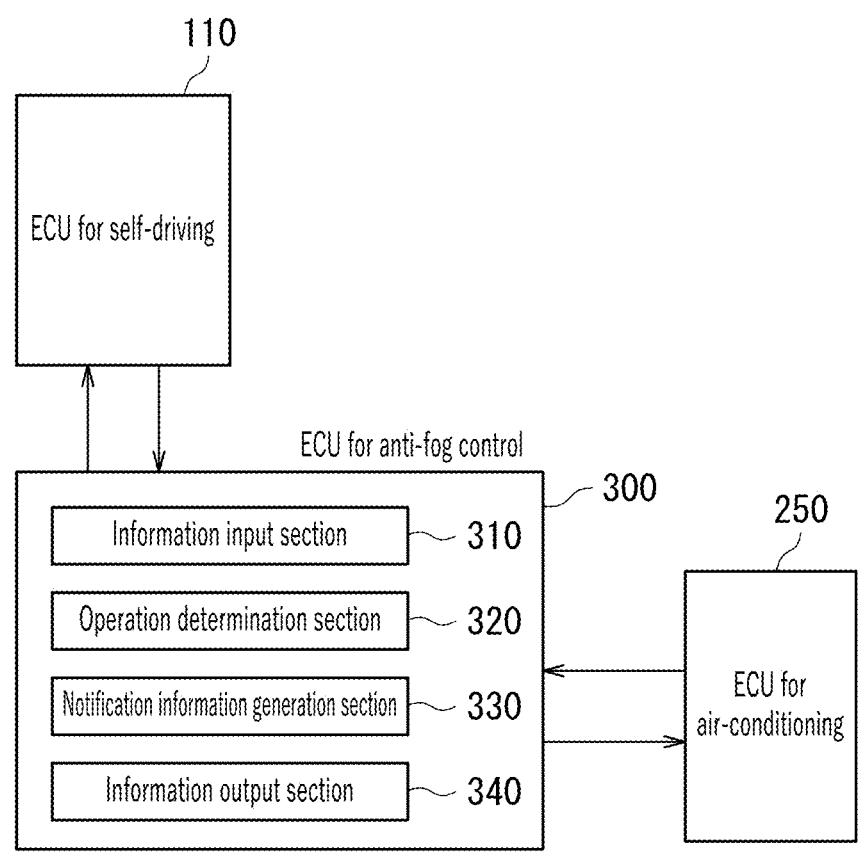
FIG. 10 is a functional block diagram of the control system related to the ECU for anti-fog control according to a third embodiment.

FIG. 10 is a functional block diagram of the control system related to an ECU 300B for anti-fog control according to this embodiment. The ECU 300B for anti-fog control according to this embodiment includes, as function sections to be executed by the control programs: the information input section 310; the operation determination section 320; the notification information generation section 330; and the information output section 340.

Since the functions of the information input section 310 and the operation determination section 320 are the same as those in the first embodiment described above, the description is omitted here.

When the operation of the air conditioner operation panel 260 has the possibility to improve the anti-fog performance of the air conditioner unit 200, the notification information generation section 330 does not generate the notification information. On the other hand, when the operation of the air conditioner operation panel 260 has the possibility to lower the anti-fog performance of the air conditioner unit 200, the notification information generation section 330 generates information to notify to the occupant that the operation of the air conditioner operation panel 260 by the occupant is disabled (i.e. the operation is not accepted).

The information output section 340 outputs the information generated by the notification information generation section 330 to the HMI 190 via the ECU 110 for self-driving. Thus, the HMI 190 notifies the occupant of the information that the operation of the air conditioner operation panel 260 by the occupant is disabled because this operation possibly lowers the anti-fog performance of the air conditioner unit 200. For example, the following text is displayed on the display, or is emitted as a voice from the speaker: "Since there is a possibility of fogging of the window due to the performed operation, this operation is disabled".

Figure 11:
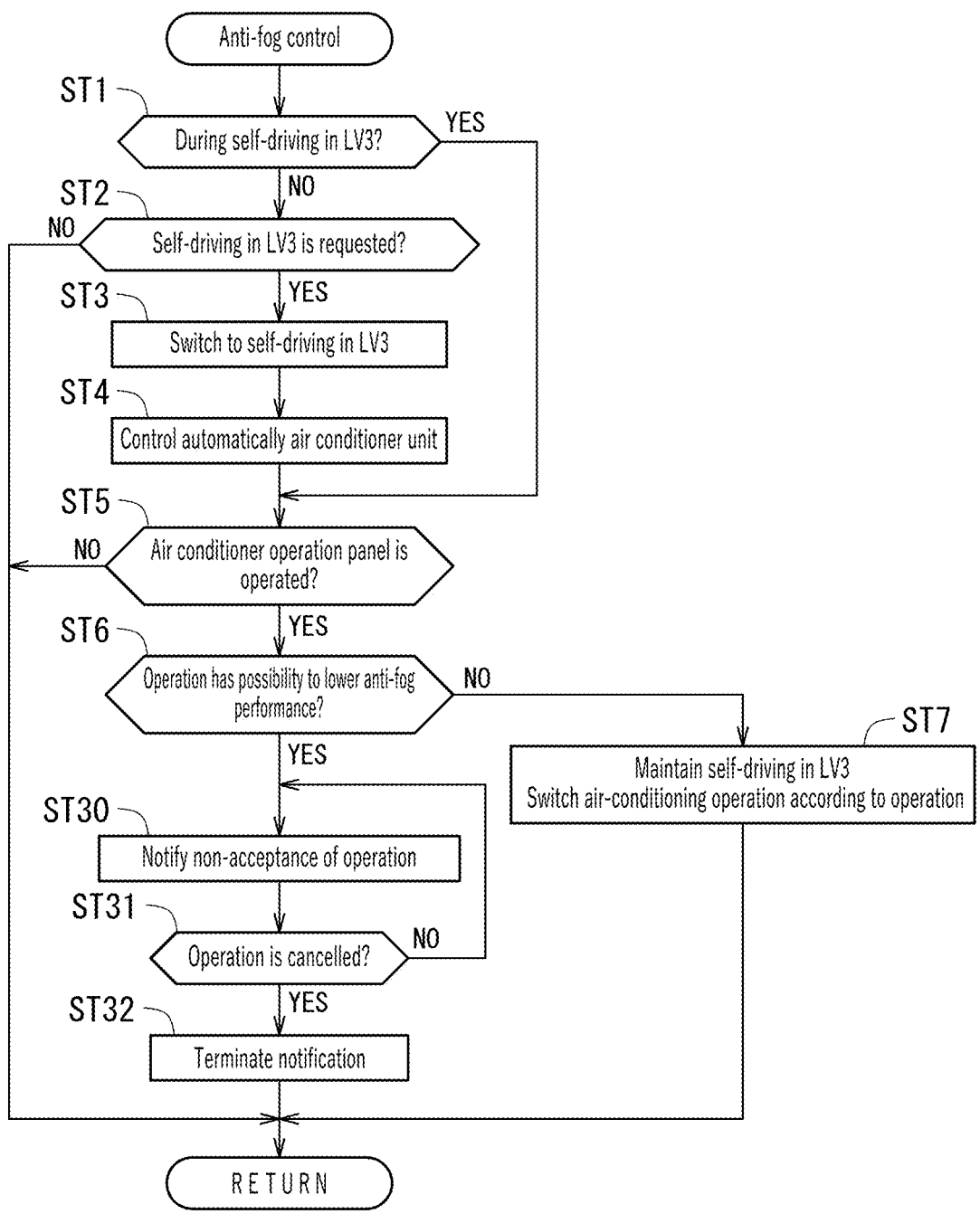
FIG. 11 is a flowchart indicating the processing procedure of the anti-fog control according to the third embodiment.

FIG. 11 is a flowchart indicating the processing procedure of the anti-fog control according to this embodiment. In FIG. 11, the steps each performing the same processing as that in the flowchart of FIG. 7 in the first embodiment have the same step numbers, and the description thereof is omitted.

The respective processing steps in step ST1 to step ST7 are the same as those in the first embodiment as described above.

When the operation of the air conditioner operation panel 260 has the possibility to lower the anti-fog performance of the air conditioner unit 200 and thus it is determined to be "YES" in step ST6, the procedure advances to step ST30 where the HMI 190 notifies the occupant of the information that the operation of the air conditioner operation panel 260 by the occupant is disabled. As described above, the following text is displayed on the display, or is emitted as a voice from the speaker: "Since there is a possibility of fogging of the window due to the performed operation, this operation is disabled".

When the above-described notification is given, the procedure advances to step ST31 where it is determined whether the operation of the air conditioner operation panel 260 (the operation possibly lowering the anti-fog performance of the air conditioner unit 200) performed in step ST5 is cancelled. That is, it is determined that the cancellation is performed when the operation opposite to the operation possibly lowering the anti-fog performance of the air conditioner unit 200 is performed or the automatic operation switch 266 is operated.

When the operation of the air conditioner operation panel 260 is cancelled and thus it is determined to be "YES" in step ST31, the procedure advances to step ST32 where the notification by the HMI 190 (i.e. notification of the information that the operation of the air conditioner operation panel 260 is disabled) is terminated. Thus, the procedure returns.

In this embodiment, when the occupant performed the operation of the air conditioner operation panel 260 possibly lowering the anti-fog performance of the air conditioner unit 200, the occupant can recognize that the operation of the air conditioner operation panel 260 is disabled because the operation performed by him/herself has the possibility to affect the self-driving level of the self-driving as well as the anti-fog performance of the air conditioner unit 200 and thus it is necessary to avoid the influence. Thus, it is possible to prevent the situation in which the operation of the air conditioner operation panel 260 is disabled without any notification and accordingly the occupant suspects malfunction of the air conditioner unit 200.

Reference Example

Here, a reference example is described. In this reference example, the behavior when the self-driving level is switched to LV3 (for example, switched from LV2 to LV3) is improved.

Figure 12:
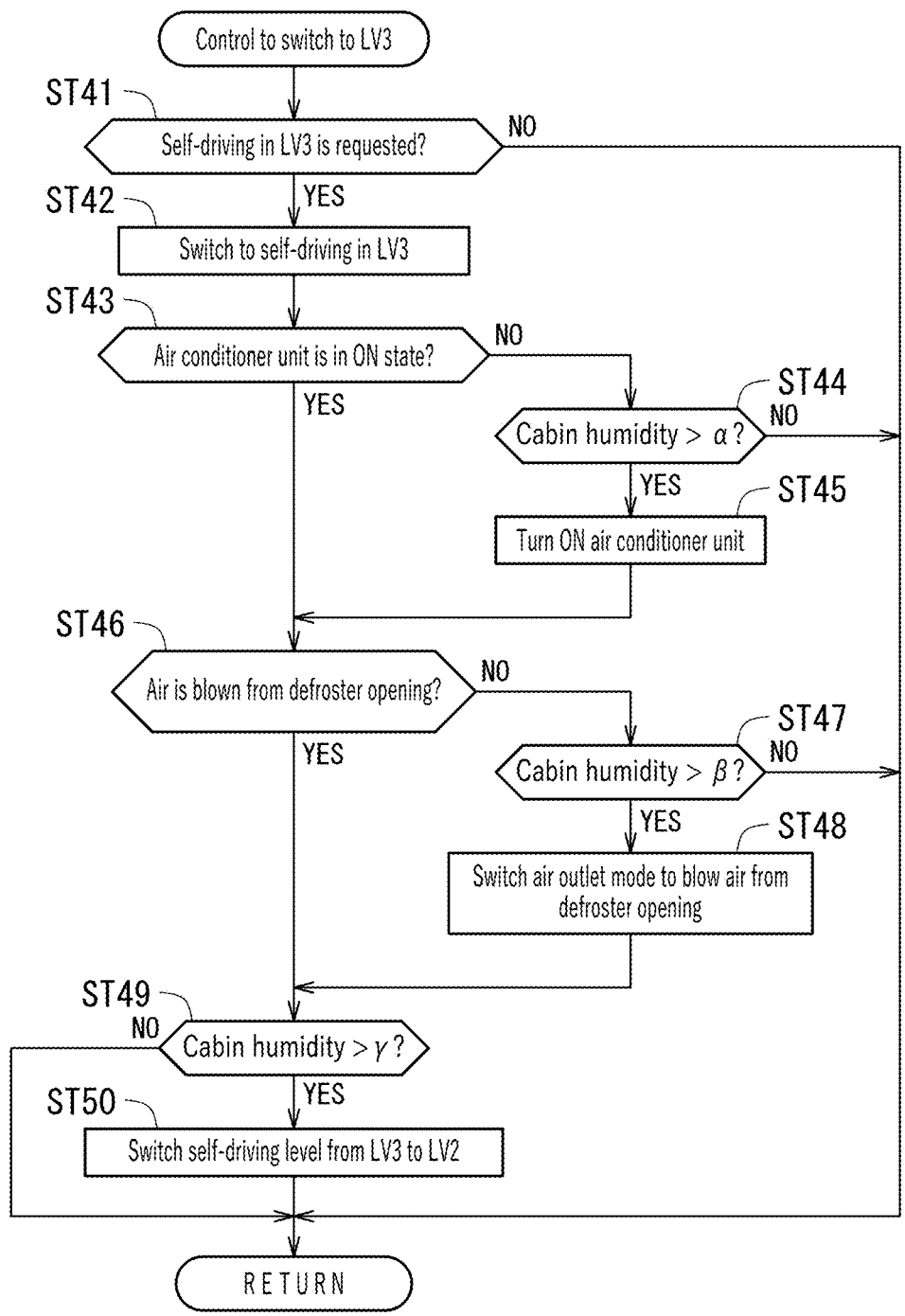
FIG. 12 is a flowchart indicating a processing procedure of control of an air conditioner unit when the vehicle driving is switched to a self-driving in LV3 in a reference example.

FIG. 12 is a flowchart indicating a processing procedure of the control of the air conditioner unit 200 when the driving state is switched to the self-driving in LV3 in this reference example.

In the step ST41, it is determined whether the self-driving in LV3 is requested from the occupant in the state in which the driving state is not the self-driving in LV3 (for example, the self-driving in LV2). When the self-driving in LV3 is not requested and thus it is determined to be "NO" in step ST41, the procedure returns.

On the other hand, when the self-driving in LV3 is requested from the occupant and thus it is determined to be "YES" in step ST41, the procedure advances to step ST 42 where the self-driving system 100 switches the self-driving level to LV3.

After switching to the self-driving in LV3 as described above, in step ST43, it is determined whether the air conditioner unit 200 is in the ON state (i.e. the state in which the compressor 231 operates) in the stage before switching to the self-driving in LV3.

When the air conditioner unit 200 is in the ON state and thus it is determined to be "YES" in step ST43, the procedure advances to step ST46. When the air conditioner unit 200 is in the OFF state and thus it is determined to be "NO" in step ST43, the procedure advances to step ST44 where it is determined whether the cabin humidity detected by the cabin humidity sensor is more than a predetermined value α. This predetermined value α may be appropriately set. When the cabin humidity is not more than the predetermined value α and thus it is determined to be "NO" in step ST44, the procedure returns. In this case, the self-driving in LV3 is performed while the current air-conditioning operation of the air conditioner unit 200 is maintained.

On the other hand, when the cabin humidity is more than the predetermined value α and thus it is determined to be "YES" in step ST44, the procedure advances to step ST 45 where the air conditioner unit 200 is turned ON, and then the procedure advances to step ST46. In this way, the anti-fog function of the air conditioner unit 200 is performed under the condition that the cabin humidity is more than the predetermined value α. Thus, it is possible to prevent the self-driving level from being switched from LV3 to LV2 when it is difficult to maintain the self-driving level in LV3 due to possible occurrence of the fogging of the window (that is, difficulty of maintenance of the self-driving in LV3 due to possible violation of the restriction of the law). In this way, it becomes possible to expand the self-driving area in LV3.

In step ST46, it is determined whether the air outlet mode of the air conditioner unit 200 is a mode in which the air is blown through the defroster opening 214 (i.e. the foot and defroster mode or the defroster mode) in the stage before switching to the self-driving in LV3.

When the air outlet mode of the air conditioner unit 200 is a mode in which the air is blown through the defroster opening 214 and thus it is determined to be "YES" in step ST46, the procedure advances to step ST 49. When the air outlet mode of the air conditioner unit 200 is a mode in which the air is not blown through the defroster opening 214 and thus it is determined to be "NO" in step ST46, the procedure advances to step ST 47 where it is determined whether the cabin humidity detected by the cabin humidity sensor is more than a predetermined value β. This predetermined value β is a value greater than the predetermined value α, and it may also be appropriately set. When the cabin humidity is not more than the predetermined value β and thus it is determined to be "NO" in step ST47, the procedure returns.

On the other hand, when the cabin humidity is more than the predetermined value β and thus it is determined to be "YES" in step ST47, the procedure advances to step ST 48 where the air outlet mode of the air conditioner unit 200 is switched to a mode in which the air is blown through the defroster opening 214, and then the procedure advances to step ST49. In this way, the anti-fog function of the air conditioner unit 200 is further performed under the condition that the cabin humidity is more than the predetermined value S. Thus, it is possible to prevent the self-driving level from being switched from LV3 to LV2 when the cabin environment is likely to cause the fogging of the window and accordingly it is difficult to maintain the self-driving level in LV3 due to possible occurrence of the fogging of the window (that is, difficulty of maintenance of the self-driving in LV3 due to possible violation of the restriction of the law). In this way, it becomes possible to expand the self-driving area in LV3.

In step ST49, it is determined whether the cabin humidity detected by the cabin humidity sensor is more than a predetermined value γ. This predetermined value γ is a value greater than the predetermined value β, and it may also be appropriately set. When the cabin humidity is not more than the predetermined value γ and thus it is determined to be "NO" in step ST49, the procedure returns.

On the other hand, when the cabin humidity is more than the predetermined value γ and thus it is determined to be "YES" in step ST49, the procedure advances to step ST 50 where the notification that the self-driving level will be switched from LV3 to LV2 is given and after that the self-driving level is switched to LV2. This processing is to switch the self-driving level to LV2 in the stage before occurrence of the fogging of the window when there is a high possibility of occurrence of the fogging of the window.

In this reference example, in the state in which the air conditioner unit 200 is in the OFF state in the stage before the switching to the self-driving in LV3, the condition under which the air conditioner unit 200 is switched to the ON state in not only the switching to the self-driving in LV3, but also the cabin humidity more than the predetermined value α. Therefore, it is possible to prevent the occupant from feeling unpleasant or discomfort due to start of the useless air-conditioning operation in the result of the suddenly change of the operating state of the air conditioner unit 200 at the time of the switching to the self-driving in LV3 regardless of the occupant's setting of the air conditioner unit 200 in the OFF state in the stage before the switching to the self-driving in LV3. Also, it is possible to improve the energy efficiency (fuel consumption and/or electricity consumption).

Also in this reference example, in the state in which the air outlet mode is a mode in which the air is not blown through the defroster opening 214 in the stage before the switching to the self-driving in LV3, the condition under which the air outlet mode is switched to the mode in which the air is blown through the defroster opening 214 is not only the switching to the self-driving in LV3, but also the cabin humidity more than the predetermined value S. Therefore, it is possible to prevent the occupant from feeling unpleasant or discomfort due to the switching to the mode in which the air is blown through the defroster opening 214 at the time of the switching to the self-driving in LV3 regardless of the occupant's setting of the mode in which the air is not blown through the defroster opening 214 in the stage before the switching to the self-driving in LV3.

Other Embodiments

The present invention is not limited to the above-described embodiments. All modifications and changes that come within the meaning and range of equivalency of the claims are intended to be embraced therein.

For example, as to a vehicle to which the present invention is applied, it is not limited to a conventional vehicle that has only an internal combustion engine as a driving force source. It may be a hybrid vehicle, an electric vehicle, a fuel cell vehicle, or the like.

Also in the first embodiment, if an operation having a possibility to lower the anti-fog performance is performed in any of the four operating systems (i.e. the air inlet mode, the air outlet mode, the air conditioner preset temperature, and the state of the compressor 231), the notification derived from the corresponding operation is given. However, the present invention is not limited thereto. The notification derived from the operation may be given when two kinds of operations having a possibility to lower the anti-fog performance are performed in the operating systems. Alternatively, the two kinds of operating systems may be distinguished from each other. Specifically, it may be distinguished between: the operating systems independently as the targets of giving the notification derived from the operation when the corresponding operation having the possibility to lower the anti-fog performance is performed in the four operating systems; and the operating systems as the targets of giving the notification derived from the operation when a plurality of kinds of operations including the corresponding operation having the possibility to lower the anti-fog performance is performed in the four operating systems.

As to the method for estimating the occurrence of the fogging of the window by the fog generation estimation section 360 in the second embodiment, it is not limited to the method as described above. The estimation may be performed based on information on detected values from various sensors and information on setting of the air conditioner unit 200. For example, it is possible to store, in the ROM, a fog-occurrence estimation map taking the parameters of the above kinds of information so as to estimate whether the fogging of the window occurs or not. Alternatively, the estimation may be performed based on information from a unit (an in-cabin camera or the like) to directly detect the fogging of the window.

Also in the first embodiment and the second embodiment, the time delay in the timer 350 is not necessarily required to be set. That is, the switching of the self-driving level and/or the switching of the operating state of the air conditioner unit 200 may be performed at the same time when the notification to the occupant is given.

Also in the third embodiment, when the operation of the air conditioner operation panel 260 has the possibility to lower the anti-fog performance of the air conditioner unit 200, the notification that the operation of the air conditioner operation panel 260 by the occupant is disabled is given to the occupant. However, the present invention is not limited thereto. When the fog generation estimation section 360 estimates that the fogging of the window occurs as described in the second embodiment, the notification of disabling of the operation of the conditioner operation panel 260 may be given to the occupant.

INDUSTRIAL APPLICABILITY

The present invention is suitably applied to a control device for a vehicle including a self-driving system and an air conditioner unit exerting an anti-fog function.

REFERENCE SIGNS LIST

100 Self-driving system
190 HMI (notification unit)
200 Air conditioner unit (air conditioner system)

260 Air conditioner operation panel (air conditioner operation section)
300 ECU for anti-fog control
330 Notification information generation section

What is claimed is:

1. A control device for a vehicle including a self-driving system that performs self-driving of the vehicle and an air conditioner system that performs an anti-fog function to prevent fogging of a window of the vehicle according to a self-driving degree that is a degree of dependence on the self-driving system for a driving operation, the control device comp rising:
an air conditioner operation section being operated by an occupant when the occupant wants to change an air-conditioning state in a cabin;
a notification unit giving a notification to the occupant; and
a notification information generation section generating notification information to notify the occupant of the notification that is derived from an operation of the air conditioner operation section by the occupant and that is given from the notification unit, under a condition that a predetermined condition is satisfied by a fact that the operation of the air conditioner operation section by the occupant has a possibility to change an anti-fog performance of the air conditioner system that is in an operating state exerting the anti-fog performance according to the self-driving degree.

2. The control device for a vehicle according to claim 1, wherein
the predetermined condition is that the operation of the air conditioner operation section by the occupant has a possibility to lower the anti-fog performance of the air conditioner system, and
the notification information includes information that the operation of the air conditioner operation section by the occupant has the possibility to lower the anti-fog performance of the air conditioner system.

3. The control device for a vehicle according to claim 1, wherein
the predetermined condition is that the fogging of the window is estimated to occur by an estimation operation of the fogging of the window based on the operation of the air conditioner operation section by the occupant and based on a cabin environment, and
the notification information includes information that the fogging of the window is estimated to occur by the estimation operation.

4. The control device for a vehicle according to claim 2, wherein
the notification information includes: information to preannounce that the self-driving degree is lowered after elapse of a predetermined time; or information to preannounce that the self-driving is terminated after elapse of the predetermined time.

5. The control device for a vehicle according to claim 4, wherein
when the operation of the air conditioner operation section is cancelled by the occupant before elapse of the predetermined time, the notification from the notification unit is terminated, and furthermore the self-driving according to the current self-driving degree is maintained by the self-driving system, and
when the operation of the air conditioner operation section is not cancelled by the occupant before elapse of the predetermined time, the air-conditioning state is switched according to the operation of the air conditioner operation section, and furthermore the self-driving degree is lowered or the self-driving is terminated by the self-driving system.

6. The control device for a vehicle according to claim 1, wherein
the predetermined condition is that the operation of the air conditioner operation section by the occupant has a possibility to lower the anti-fog performance of the air conditioner system, and
the notification information includes information that the operation of the air conditioner operation section is not accepted.

* * * * *